US012651533B2

(12) United States Patent
Knag et al.

(10) Patent No.: US 12,651,533 B2
(45) Date of Patent: Jun. 9, 2026

(54) COUNTERMEASURE DEVICE WITH ASSOCIATE DISPLAY

(71) Applicant: DEDRONE HOLDINGS, INC., San Francisco, CA (US)

(72) Inventors: John Knag, San Francisco, CA (US); Zachary Schmid, San Francisco, CA (US)

(73) Assignee: Dedrone Holdings, Inc., San Francisco, CA (US)

( * ) Notice: Subject to any disclaimer, the term of this patent is extended or adjusted under 35 U.S.C. 154(b) by 154 days.

(21) Appl. No.: 18/507,543

(22) Filed: Nov. 13, 2023

(65) Prior Publication Data

US 2025/0157348 A1 May 15, 2025

(51) Int. Cl.
*G08G 5/72* (2025.01)
*H04N 7/18* (2006.01)

(52) U.S. Cl.
CPC ............. *G08G 5/727* (2025.01); *H04N 7/183* (2013.01)

(58) Field of Classification Search
CPC .. G08G 5/26; G08G 5/57; G08G 5/70; G08G 5/72
See application file for complete search history.

(56) References Cited

U.S. PATENT DOCUMENTS

| | | | |
|---|---|---|---|
| 4,584,578 A | 4/1986 | Brauns et al. | |
| 5,001,771 A | 3/1991 | New | |
| 5,287,110 A | 2/1994 | Tran | |
| 5,822,429 A | 10/1998 | Casabona et al. | |
| 5,828,626 A | 10/1998 | Castile et al. | |
| 5,896,105 A | 4/1999 | Murphy et al. | |
| 6,223,461 B1 | 5/2001 | Mardirossian | |
| 6,230,371 B1 | 5/2001 | Chu | |

(Continued)

FOREIGN PATENT DOCUMENTS

| | | | | |
|---|---|---|---|---|
| KR | 102290533 B1 * | 8/2021 | ............... | G08G 5/70 |
| WO | 2007012147 A2 | 2/2007 | | |

(Continued)

OTHER PUBLICATIONS

Giering, M., et al, "Multi-modal Sensor Registration for Vehicle Perception via Deep Neural Networks," arXiv:1412.7006v2 [cs. CV] Jul. 8, 2015.

(Continued)

*Primary Examiner* — Chante E Harrison
(74) *Attorney, Agent, or Firm* — Bradley Arant Boult Cummings LLP; Adam J. Thompson, Esq.; Daniel E. Sineway, Esq.

(57) ABSTRACT

A countermeasure device can include an antenna, signal disruption components, a display, and a computing device. The computing device can determine that an unidentified aerial vehicle (UAV) is within a particular airspace. The computing device can determine a location corresponding to the countermeasure device. The computing device can determine a range of a particular attack signal. The computing device can monitor a distance between the location of the countermeasure device and a location of the UAV. The computing device can render positional information comprising the distance on the display. The computing device can generate the particular attack signal in response to the distance being less than the range of the particular attack signal.

15 Claims, 7 Drawing Sheets

(56) References Cited

U.S. PATENT DOCUMENTS

| | | | |
|---|---|---|---|
| 6,396,432 B2 | 5/2002 | Riemschneider et al. | |
| 6,480,144 B1 | 11/2002 | Miller et al. | |
| 6,977,598 B2 | 12/2005 | Longbottom | |
| 7,050,755 B2 | 5/2006 | Kline | |
| 7,099,369 B2 | 8/2006 | Karlsson | |
| 7,218,759 B1 | 5/2007 | Ho et al. | |
| 7,318,368 B2 | 1/2008 | Ham et al. | |
| 7,423,575 B2 | 9/2008 | Duff et al. | |
| 7,489,264 B2 | 2/2009 | Ferm et al. | |
| 7,554,481 B2 | 6/2009 | Cohen et al. | |
| 7,574,168 B2 | 8/2009 | Twitchell, Jr. et al. | |
| 7,697,885 B2 | 4/2010 | Stoddard | |
| 7,698,846 B2 | 4/2010 | Do Amarante et al. | |
| 7,715,597 B2 | 5/2010 | Costache et al. | |
| 7,783,246 B2 | 8/2010 | Twitchell, Jr. et al. | |
| 7,784,390 B1 | 8/2010 | Lowell et al. | |
| 8,001,901 B2 | 8/2011 | Bass | |
| 8,135,661 B2 | 3/2012 | Olsson | |
| 8,145,119 B2 | 3/2012 | Cornwell | |
| 8,170,467 B2 | 5/2012 | Stoddard | |
| 8,203,109 B2 | 6/2012 | Taylor et al. | |
| 8,269,957 B2 | 9/2012 | Saban et al. | |
| 8,301,075 B2 | 10/2012 | Sherman et al. | |
| D672,832 S | 12/2012 | Gerwig | |
| 8,388,243 B1 | 3/2013 | Smith | |
| 8,615,190 B2 | 12/2013 | Lu | |
| 8,903,304 B2 | 12/2014 | Coleman et al. | |
| D722,672 S | 2/2015 | Juarez | |
| 8,971,441 B2 | 3/2015 | Dowla et al. | |
| 9,071,385 B2 | 6/2015 | Delaveau et al. | |
| D745,103 S | 12/2015 | Corsi et al. | |
| 9,201,421 B1 | 12/2015 | Fairfield et al. | |
| 9,207,049 B2 | 12/2015 | Rovinsky | |
| D763,396 S | 8/2016 | Juarez | |
| 9,404,750 B2 | 8/2016 | Rios | |
| D769,394 S | 10/2016 | Young et al. | |
| D779,012 S | 2/2017 | Abbott | |
| D780,277 S | 2/2017 | Barnett | |
| D787,619 S | 5/2017 | Young et al. | |
| 9,689,976 B2 | 6/2017 | Parker et al. | |
| 9,715,009 B1 | 7/2017 | Parker et al. | |
| 9,816,783 B1 | 11/2017 | Means et al. | |
| D814,591 S | 4/2018 | Koçgür et al. | |
| D814,598 S | 4/2018 | Monti | |
| 9,977,117 B2 | 5/2018 | Parker et al. | |
| 10,020,909 B2 | 7/2018 | Stamm et al. | |
| D826,204 S | 8/2018 | Ozkaner et al. | |
| 10,043,405 B1 | 8/2018 | Chartier et al. | |
| 10,103,835 B2 | 10/2018 | Morrow et al. | |
| 10,156,631 B2 | 12/2018 | Parker et al. | |
| 10,229,329 B2 | 3/2019 | Seeber et al. | |
| 10,231,101 B2 | 3/2019 | Gozalvez-Serrano et al. | |
| 10,237,012 B2 | 3/2019 | Morrow et al. | |
| 10,281,570 B2 | 5/2019 | Parker et al. | |
| 10,302,759 B1 | 5/2019 | Arteaga | |
| D855,138 S | 7/2019 | Cheng et al. | |
| D855,730 S | 8/2019 | Stamm et al. | |
| D855,731 S | 8/2019 | Stamm et al. | |
| 10,505,622 B1 | 12/2019 | Stein et al. | |
| 10,567,107 B2 | 2/2020 | Morrow et al. | |
| 10,574,384 B2 | 2/2020 | Morrow et al. | |
| 10,621,443 B2 | 4/2020 | Seeber et al. | |
| 10,670,696 B2 | 6/2020 | Parker et al. | |
| 10,739,451 B1 | 8/2020 | Parker et al. | |
| 10,790,925 B2 | 9/2020 | Morrow et al. | |
| 10,795,010 B2 | 10/2020 | Parker et al. | |
| 10,907,940 B1 | 2/2021 | Parker et al. | |
| 11,095,392 B2 | 8/2021 | Morrow et al. | |
| 2003/0011706 A1 | 1/2003 | Chang et al. | |
| 2003/0058112 A1 | 3/2003 | Gleine | |
| 2003/0110675 A1 | 6/2003 | Garrett et al. | |
| 2005/0011101 A1 | 1/2005 | Gooder | |
| 2005/0041728 A1 | 2/2005 | Karlsson | |
| 2006/0002625 A1 | 1/2006 | Haven et al. | |
| 2006/0200658 A1 | 9/2006 | Penkethman | |
| 2006/0226950 A1 | 10/2006 | Kanou et al. | |
| 2007/0063886 A1 | 3/2007 | Brumley et al. | |
| 2007/0092143 A1 | 4/2007 | Higgins | |
| 2008/0036659 A1 | 2/2008 | Smith et al. | |
| 2008/0174469 A1 | 7/2008 | Stark et al. | |
| 2009/0214205 A1 | 8/2009 | Clark et al. | |
| 2009/0287363 A1 | 11/2009 | Young | |
| 2010/0194622 A1 | 8/2010 | Clingman et al. | |
| 2010/0315281 A1 | 12/2010 | Askelson et al. | |
| 2011/0000389 A1 | 1/2011 | Fullerton | |
| 2011/0176674 A1 | 7/2011 | Romain | |
| 2011/0273322 A1 | 11/2011 | Melum et al. | |
| 2013/0015260 A1 | 1/2013 | Schulte | |
| 2013/0023201 A1 | 1/2013 | Coleman et al. | |
| 2013/0329052 A1 | 12/2013 | Chew | |
| 2014/0055298 A1 | 2/2014 | Abl | |
| 2014/0145993 A1 | 5/2014 | Nakayama | |
| 2014/0147116 A1 | 5/2014 | Krupkin | |
| 2014/0157209 A1 | 6/2014 | Dalal et al. | |
| 2014/0266851 A1 | 9/2014 | Fink et al. | |
| 2014/0270350 A1 | 9/2014 | Rodriguez-Serrano et al. | |
| 2014/0272807 A1 | 9/2014 | Guenther et al. | |
| 2014/0327564 A1 | 11/2014 | Sampigethaya | |
| 2015/0193101 A1 | 7/2015 | Mannon et al. | |
| 2015/0229434 A1 | 8/2015 | Shawn | |
| 2015/0302858 A1 | 10/2015 | Hearing et al. | |
| 2015/0331099 A1 | 11/2015 | Wu et al. | |
| 2015/0350914 A1 | 12/2015 | Baxley et al. | |
| 2016/0202025 A1 | 7/2016 | Di Mauro Lorenzi | |
| 2016/0245907 A1 | 8/2016 | Parker et al. | |
| 2017/0103659 A1 | 4/2017 | Jin | |
| 2017/0109878 A1 | 4/2017 | Yang et al. | |
| 2017/0148332 A1 | 5/2017 | Ziemba et al. | |
| 2017/0237520 A1 | 8/2017 | Morrow et al. | |
| 2017/0250778 A1 | 8/2017 | Stamm et al. | |
| 2017/0278404 A1 | 9/2017 | Gordon et al. | |
| 2017/0301248 A1 | 10/2017 | Silverman | |
| 2017/0358214 A1 | 12/2017 | Scarlatti et al. | |
| 2018/0129881 A1 | 5/2018 | Seeber et al. | |
| 2018/0257780 A1 | 9/2018 | Sassinsky | |
| 2019/0003807 A1 | 1/2019 | Whitmarsh et al. | |
| 2019/0019420 A1 | 1/2019 | X et al. | |
| 2019/0020404 A1 | 1/2019 | Russell | |
| 2019/0103030 A1* | 4/2019 | Banga | G01S 5/0027 |
| 2019/0266904 A1 | 8/2019 | Kant et al. | |
| 2020/0062392 A1 | 2/2020 | Yoon | |
| 2020/0108923 A1* | 4/2020 | Smith | G05D 1/104 |
| 2020/0108924 A1* | 4/2020 | Smith | B64D 1/02 |
| 2020/0108925 A1* | 4/2020 | Smith | G05D 1/0094 |
| 2020/0272827 A1* | 8/2020 | Morrow | G06T 7/11 |
| 2020/0353894 A1 | 11/2020 | Obaidi | |
| 2023/0043724 A1* | 2/2023 | Morrow | G08G 5/55 |
| 2025/0116488 A1* | 4/2025 | Branco | H04K 3/90 |

FOREIGN PATENT DOCUMENTS

| | | | | |
|---|---|---|---|---|
| WO | 2007012148 A1 | 2/2007 | | |
| WO | 2014021970 A2 | 2/2014 | | |
| WO | 2016122739 A2 | 8/2016 | | |
| WO | WO-2017053693 A1 * | 3/2017 | | H04K 3/825 |

OTHER PUBLICATIONS

Non-Final Office Action for U.S. Appl. No. 17/889,897, mailed Oct. 17, 2024, 17 Pages.

Notice of Allowance for U.S. Appl. No. 29/642,228, mailed Sep. 11, 2019, 5 Pages.

Notice of Allowance for U.S. Appl. No. 29/642,233, mailed Sep. 11, 2019, 5 Pages.

Notice of Allowance for U.S. Appl. No. 29/680,172, mailed Sep. 9, 2019, 6 Pages.

Notice of Allowance for U.S. Appl. No. 29/680,173, mailed Sep. 10, 2019, 6 Pages.

"Phone Jammer-Wholesale Jammer-DropShip From China," vol. 7, 2015, 3 Pages, Retrieved from URL: http://www.jammerfromchina. com.

(56)        References Cited

OTHER PUBLICATIONS

"RF Jammer," Directional RF Jammer for Blocking Cellular Phone Calls, 2011, 3 Pages, Retrieved from URL: http://www.secintel.com.

Scott H., "Hack Rifle," Hscott, Jan. 19, 2015, 8 Pages, XP055603905, [Retrieved on May 10, 2019] Retrieved from URL: https://www.hscott.net/hack-rifle/.

Wired: "Security Cavities Ail Bluetooth," Aug. 6, 2004, Retrieved from URL: https://www.wired.com/2004/08/security-cavities-ail-bluetooth/.

"Wireless 50W High Power Explosionproof Signal Jammer", 3G Mobile Phone Jammer, vol. 1, 3 Pages, Retrieved from URL: http://www.jammerfromchina.com.

"World's First Fully Integrated Anti-UAV Defence System (AUDS) Now Features Quad Band RF Inhibitor and Optical Disruptor," Sep. 8, 2015, 6 Pages, Retrieved from URL: https://www.blighter.com/worlds-first-fully-integrated-anti-uav-defence-system-auds-now-features-quad-band-rf-inhibitor-and-optical-disruptor/.

YouTube: "AUDS-Anti-UAV Defence System," May 11, 2019, 3 Pages, Retrieved from URL: https://www.youtube.com/watchtime_continue=66N&N=P8aZ0zWX3SA.

"5 Antenna Portable 2G 3G Mobile Phone WiFi GPS Signal Jammer," CDMA/GSM|DGS/PCS_3G_WIFi_GPS Signal Blocker Portable Jammer, 2015, 3 Pages.

Anonymous: "How To: Building a BlueSniper Rifle—Part 1," Small Net Builder, Mar. 8, 2005, 41 Pages, XP055603917, [Retrieved on May 13, 2019] Retrieved from URL: https://www.smallnetbuilder.com/wireless/wireless-howto/24256-howtobluesniperpt1.

Anonymous: "WiFi Sniper Rifle," Medic For Life, Jun. 21, 2011, pp. 1-3, XP055604788, [Retrieved on May 10, 2019] Retrieved from URL: http://medicforlife.blogspot.com/2011/06/wifi-sniper-rifle.html.

Benchoff B., "Sniping 2.4GHz," Hackaday, Apr. 21, 2014, 20 Pages, XP055603923, [Retrieved on May 10, 2019] URL: https://hackaday.com/2014/04/21/sniping-2-4ghz/.

"Clear Sky," Jammers e-RAKE, 2007, 6 Pages, Retrieved from URL: http://www.hypercable.fr.

"Search Product by Functions," Cell Phone Jammer Search by Functions, 2015, 5 Pages, Retrieved from URL: http://www.jammerfromchina.com.

ESATO: "Bluetooth-Cracking Gun," Aug. 6, 2004, 2 Pages, XP055604795, [Retrieved on May 10, 2019] Retrieved from URL: https://www.defcon.org/html/links/dc_press/archives/12/esato_bluetoothcracking.htm.

Examination Report for Australian Application No. 2016325606, dated Dec. 3, 2018.

Final Office Action for U.S. Appl. No. 15/970,110, mailed Oct. 3, 2018, 8 Pages.

Final Office Action for U.S. Appl. No. 16/005,905, mailed Jun. 10, 2019, 12 Pages.

Final Office Action for U.S. Appl. No. 17/236,682, mailed Oct. 26, 2021, 9 Pages.

Fitriyani Y., et al., "Yagi Antenna Design for Signal Phone Jammer," 2012, 6 Pages.

"Handheld Selectable Bluetooth GPSL1 GPSL2 GPSL5 3G Mobile Phone Signal Jammer," 2015, 3 Pages, Retrieved from URL: http://www.jammerfromchina.com.

"Handheld Style Powerful Selectable WiFi GPS Jammer All Wireless Bug Camera Blocker," 3W High Power Portable All Wireless Bug Camera, vol. 2, 2015, 3 Pages, Retrieved from URL: http://www.jammerfromchina.com.

"High Gain Directional Antennas for High Power Adjustable WiFi Phone Jammer," 2014, 2 Pages, Retrieved from URL: http://www.alljammers.com.

International Preliminary Report on Patentability for International Application No. PCT/US2016/053291, mailed Apr. 5, 2018, 8 Pages.

International Preliminary Report on Patentability for International Application No. PCT/US2018/032732, mailed Nov. 28, 2019, 8 Pages.

International Preliminary Report on Patentability for International Application No. PCT/US2019/017750, mailed Dec. 24, 2020, 8 Pages.

International Search Report and Written Opinion for International Application No. PCT/US2016/053291, mailed Dec. 20, 2016, 10 Pages.

International Search Report and Written Opinion for International Application No. PCT/US2018/032732, mailed Aug. 8, 2018, 10 Pages.

International Search Report and Written Opinion for International Application No. PCT/US2019/017750, mailed May 14, 2019, 10 Pages.

Jisrawi A., "Drone Jammer Instruction Set," 10 Pages.

"Newest All-in-one Portable Selectable 2G 3G 4G Cell Phone Blocker & GPS Jammer," New Arrival All-in-one Handheld GPS 2G 3G 4G Mobile Phone, vol. 5, 2015, 3 Pages, Retrieved from URL: http://www.jammerfromchina.com.

Non-Final Office Action for U.S. Appl. No. 15/274,021, mailed Jun. 27, 2017, 10 Pages.

Non-Final Office Action for U.S. Appl. No. 15/596,842, mailed Oct. 5, 2017, 7 Pages.

Non-Final Office Action for U.S. Appl. No. 15/970,110, mailed Jun. 13, 2018, 10 Pages.

Non-Final Office Action for U.S. Appl. No. 16/005,905, mailed Dec. 9, 2019, 07 Pages.

Non-Final Office Action for U.S. Appl. No. 16/005,905, mailed Dec. 26, 2018, 12 Pages.

Non-Final Office Action for U.S. Appl. No. 16/235,280, mailed May 14, 2019, 14 Pages.

Non-Final Office Action for U.S. Appl. No. 16/863,515, mailed Jun. 2, 2021, 8 Pages.

Non-Final Office Action for U.S. Appl. No. 16/864,854, mailed Oct. 14, 2021, 13 Pages.

Non-Final Office Action for U.S. Appl. No. 17/236,682, mailed Jul. 6, 2021, 14 Pages.

Notice of Allowance for U.S. Appl. No. 15/274,021, mailed Apr. 5, 2018, 4 Pages.

Notice of Allowance for U.S. Appl. No. 15/274,021, mailed Feb. 6, 2018, 2 Pages.

Notice of Allowance for U.S. Appl. No. 15/274,021, mailed Jan. 16, 2018, 7 Pages.

Notice of Allowance for U.S. Appl. No. 15/274,021, mailed Nov. 27, 2017, 9 Pages.

Notice of Allowance for U.S. Appl. No. 15/596,842, mailed Mar. 6, 2018, 7 Pages.

Notice of Allowance for U.S. Appl. No. 15/970,110, mailed Nov. 5, 2018, 7 Pages.

Notice of Allowance for U.S. Appl. No. 15/970,110, mailed Jan. 9, 2019, 2 Pages.

Notice of Allowance for U.S. Appl. No. 16/005,905, mailed May 27, 2020, 7 Pages.

Notice of Allowance for U.S. Appl. No. 16/235,280, mailed Oct. 9, 2019, 8 Pages.

Notice of Allowance for U.S. Appl. No. 16/274,325, mailed Oct. 16, 2019, 9 Pages.

Notice of Allowance for U.S. Appl. No. 16/863,515, mailed Oct. 1, 2021, 5 Pages.

Notice of Allowance for U.S. Appl. No. 16/864,854, mailed Jun. 27, 2022, 10 Pages.

Notice of Allowance for U.S. Appl. No. 17/236,682, mailed Nov. 29, 2021, 8 Pages.

Notice of Allowance for U.S. Appl. No. 29/610,100, mailed Apr. 11, 2019, 5 Pages.

Notice of Allowance for U.S. Appl. No. 29/610,106, mailed Apr. 11, 2019, 5 Pages.

Notice of Allowance for U.S. Appl. No. 29/610,107, mailed Jul. 10, 2019, 5 Pages.

Notice of Allowance for U.S. Appl. No. 29/610,107, mailed Apr. 11, 2019, 5 Pages.

Notice of Allowance for U.S. Appl. No. 29/610,107, mailed Dec. 19, 2019, 2 Pages.

* cited by examiner

COUNTERMEASURE DEVICE WITH ASSOCIATE DISPLAY

TECHNICAL FIELD

The present disclosure relates generally to systems and methods for disabling unmanned aerial vehicles (UAVs) using a countermeasure device and more specifically to displaying pertinent information during use on a display associated with the countermeasure device.

BACKGROUND

With the growing popularity of commercial unmanned aerial vehicles (UAVs), security in restricted air spaces has become an area of upmost importance. To limit the flying capabilities of UAVs in restricted areas, entities have sought to create a tool that can disable UAVs during flight. The main issue with current systems is the lack of visualization tools. Identifying UAVs flying at large distances from the user can be an incredibly difficult task. Additionally, the lack of visualization tools makes it increasingly difficult for the user to orient any device used to jam the communication of the UAV, especially when the device is handheld. Moreover, there are many metrics that are useful to the user when jamming the communication of the UAV that aren't readily available to the user. For example, in an airspace with multiple UAVs, it is important to identify friendly UAVs from unknown or hostile UAVs. Another issue with current systems is the lack of connectability to other devices. For example, tools for disabling UAVs can benefit greatly from connecting with other computing devices.

Therefore, there exists a long felt but unresolved need for systems and methods that integrate visual technologies into a device for disabling UAVs, where the integrated visual technologies can help identify UAVs, help visualize the various UAVs in a particular space, and help connect with other computing devices for further processing and functionalities.

BRIEF SUMMARY OF DISCLOSURE

Briefly described, and in various embodiments, the present disclosure relates to systems and methods for jamming a communication of one or more unmanned aerial vehicles (UAVs) flying in a restricted airspace. The disclosed system can include a handheld, mounted, and/or stationary countermeasure device used to generate an attack signal to disable the one or more UAVs. The attack signal can include any particular noise and/or jamming signal used to disable the particular UAV.

The countermeasure device can include a display. The countermeasure device can render onto the display a map and one or more UAVs that correspond with UAVs flying in the direction of the countermeasure device. The countermeasure device can render onto the display a directional arrow, targeting reticle, or compass that points the user of the countermeasure device in the direction of the particular UAV. The display can allow users to visualize the direction and location of distant UAVs that were previously unobservable to the human eye due to their distance from the user. The countermeasure device can update in real-time the location, distance, alignment, and directional arrow, targeting reticle, or compass rendered on the display based on the movement of the user relative to the particular UAV. Once aligned, the countermeasure device can generate the attack signal to disable to UAV. If the countermeasure device loses alignment with the particular UAV, the countermeasure device can render the directional arrow, targeting reticle, or compass in the direction of the particular UAV and prompt the user to realign the countermeasure device with the particular UAV by following the directional arrow.

The countermeasure device can interact with other deployed components of the disclosed system to perform particular actions. For example, the countermeasure device can communicate with one or more auxiliary devices to calibrate the sensors and components of the countermeasure device and/or the auxiliary devices. The countermeasure device can provide both a signal sensible to the sensor as well as the "ground truth" data of what the sensor should be sensing in order to achieve calibration of the sensor. The display of the countermeasure device can provide information discussing the process to perform a calibration procedure of the countermeasure device and/or the auxiliary device. The countermeasure device can communicate with one or more client device and a computing environment.

According to a first aspect, a countermeasure device, comprising: A) at least one antenna; B) at least one signal disruption component in electronic communication with the at least one antenna; C) a display; and D) at least one computing device in communication with the display and the at least one signal disruption component, the at least one computing device being configured to: 1) determine that an unidentified aerial vehicle (UAV) is within a particular airspace; 2) determine a location corresponding to the countermeasure device; 3) determine a range of a particular attack signal; 4) monitor a distance between the location of the countermeasure device and a location of the UAV; 5) render positional information comprising the distance on the display; and 6) in response to the distance being less than the range of the particular attack signal, generating, via the signal disruption component and the at least one antenna, the particular attack signal.

According to a further aspect, the countermeasure device of the first aspect or any other aspect, wherein the at least one computing device is further configured to: A) determine a type of protocol being used by the UAV; and B) load an attack library corresponding to the type of protocol, wherein the attack library comprises the particular attack signal.

According to a further aspect, the countermeasure device of the first aspect or any other aspect, wherein the at least one computing device is further configured to determine that the UAV is within the particular airspace by receiving a message from a UAV tracking system indicating that the UAV is within the particular airspace.

According to a further aspect, the countermeasure device of the first aspect or any other aspect, wherein the at least one computing device is further configured to monitor the distance between the location of the countermeasure device and the location of the UAV by iteratively: A) receiving a current location of the UAV from a UAV tracking system; B) determining a current location of the countermeasure device; and C) calculating the distance between the current location of the UAV and the current location of the countermeasure device.

According to a further aspect, the countermeasure device of the first aspect or any other aspect, wherein the at least one computing device is further configured to monitor the distance between the location of the countermeasure device and the location of the UAV by iteratively: A) determining a current location of the countermeasure device; B) transmitting the current location of the countermeasure device to a UAV tracking system; and C) receiving, from the UAV tracking system, the distance between the current location of the UAV and the current location of the countermeasure device.

According to a further aspect, the countermeasure device of the first aspect or any other aspect, wherein the range of the particular attack signal is based on a frequency of the particular attack signal.

According to a further aspect, the countermeasure device of the first aspect or any other aspect, further comprising at least one motor and wherein the at least one computing device is further configured to adjust a direction of the at least one antenna via the at least one motor.

According to a further aspect, the countermeasure device of the first aspect or any other aspect, wherein the at least one computing device is further configured to receive a command from a UAV tracking system to move the at least one antenna in the direction, wherein the direction of the at least one antenna is adjusted via the at least one motor in response to the command.

According to a second aspect, a system, comprising: A) a countermeasure device comprising: 1) at least one directional antenna; 2) at least one signal disruption component in electronic communication with the at least one directional antenna; 3) a display; and 4) at least one computing device in communication with the display and the at least one signal disruption component, the at least one computing device being configured to: i) determine that an unidentified aerial vehicle (UAV) is within a particular airspace; ii) determine a location corresponding to the countermeasure device; iii) determine a range of a particular attack signal; iv) monitor a distance between the location of the countermeasure device and a location of the UAV; v) render positional information comprising the distance on the display; and vi) in response to the distance being less than the range of the particular attack signal, generating, via the signal disruption component and the at least one antenna, the particular attack signal.

According to a further aspect, the system of the second aspect or any other aspect, further comprising a UAV tracking system configured to: A) determine that the UAV is within the particular airspace via at least one sensor; and B) send a message to the countermeasure device indicating that the UAV is within the particular airspace.

According to a further aspect, the system of the second aspect or any other aspect, wherein the at least one computing device is further configured to: A) determine that the particular attack signal is ready to be transmitted; B) transmit a request to emit a transmission to the UAV tracking system comprising transmission metadata; and C) receive a command to transmit from the UAV tracking system, wherein the particular attack signal is transmitted subsequent to receiving the command.

According to a further aspect, the system of the second aspect or any other aspect, wherein the UAV tracking system is further configured to: A) receive the request to emit a transmission comprising the transmission metadata; B) determining a subset of the particular airspace targeted by countermeasure device based on the transmission metadata; C) determine a list of other devices using wireless frequencies in the subset of the particular airspace; D) determine whether the transmission will disrupt communication of any of the list of other devices; and E) in response to the transmission not disrupting the communication of any of the list of other devices, send the command to transmit.

According to a further aspect, the system of the second aspect or any other aspect, wherein A) the UAV tracking system is further configured to: 1) determine at least one threat proximate to the location corresponding to the countermeasure device; and 2) transmit data describing the at least one threat to the countermeasure device; and B) the at least one computing device is further configured to: 1) receive the data describing the at least one threat from the UAV tracking system; and 2) render each of the at least one threat on a map on the display, wherein the map is centered on the location of the countermeasure device.

According to a further aspect, the system of the second aspect or any other aspect, wherein the UAV tracking system is further configured to: A) determine a current location and orientation of the countermeasure device aimed toward a sensor of the UAV tracking system; B) send instructions to the countermeasure device to transmit a specific signal; and C) calibrate the sensor responsive to receiving the specific signal via the sensor based on the current location and the orientation of the countermeasure device.

According to a third aspect, a method, comprising: A) determining, via one of one or more computing devices, that an unidentified aerial vehicle (UAV) is within a particular airspace; B) determining, via one of the one or more computing devices, a location corresponding to a countermeasure device; C) determining, via one of the one or more computing devices, a range of a particular attack signal; D) monitoring, via one of the one or more computing devices, a distance between the location of the countermeasure device and a location of the UAV; E) rendering, via one of the one or more computing devices, positional information comprising the distance on a display of the countermeasure device; and F) in response to the distance being less than the range of the particular attack signal, generating, via a signal disruption component and at least one antenna of the countermeasure device, the particular attack signal.

According to a further aspect, the method of the third aspect or any other aspect, further comprising: A) determining, via one of the one or more computing devices, that the UAV is no longer within the range of the countermeasure device; and B) in response to determining that the UAV is no longer within the range, stopping generation of the particular attack signal.

According to a further aspect, the method of the third aspect or any other aspect, wherein a command to generate the particular attack signal originates from a UAV tracking system.

According to a further aspect, the method of the third aspect or any other aspect, further comprising: A) identifying, via one of the one or more computing devices, an orientation corresponding to the countermeasure device; B) computing, via one of the one or more computing devices, a position of the UAV relative to an aiming direction of the countermeasure device; and C) in response to the position being within the aiming direction, rendering, via one of the one or more computing devices, an indicator on a display of the countermeasure device at a position corresponding to the position of the UAV.

According to a further aspect, the method of the third aspect or any other aspect, further comprising: A) rendering, via one of the one or more computing devices, a camera feed from the countermeasure device on the display; and B) augmenting, via one of the one or more computing devices, the camera feed by rendering an overlay, wherein the overlay is based on at least one of: a position of the UAV, a type of signal being emitted, proximate wireless signals, proximate UAVs, or proximate countermeasure devices.

According to a further aspect, the method of the third aspect or any other aspect, wherein the particular attack signal comprising a combination of a plurality of different frequencies.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
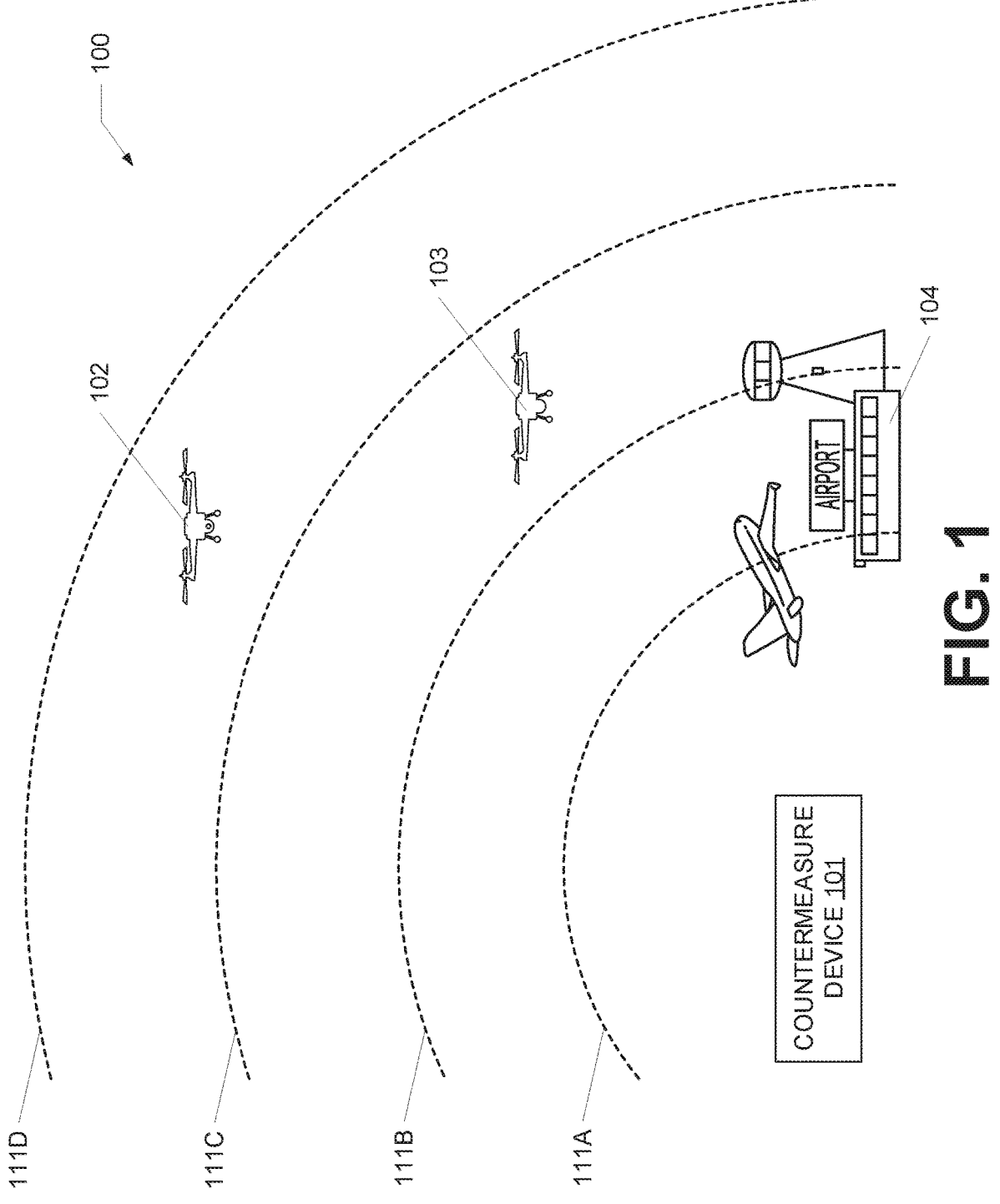
FIG. 1 illustrates an example countermeasure environment, according to one aspect of the present disclosure.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which disclosure relates. All limitations of scope should be determined in accordance with and as expressed in the claims.

Aspects of the present disclosure generally relate to systems and methods for jamming a communication of one or more unmanned aerial vehicles (UAVs) flying in a restricted airspace. The disclosed system can include a handheld, mounted, and/or stationary countermeasure device used to generate an attack signal to disable the one or more UAVs. The attack signal can include any particular noise and/or jamming signal used to disable the particular UAV. The countermeasure device can be deployed, for example, at an airport to restrict the flight of commercial UAVs in the associated airspace.

The countermeasure device can include a display. The countermeasure device can render onto the display a map and one or more UAVs that correspond with UAVs flying in the direction of the countermeasure device. The countermeasure device can employ a computing device, sensors, and a signal disruption component to analyze the position of the countermeasure device, calculate the location of the countermeasure device relative to the particular UAV, and generate the attack signal to disable the particular UAV. The countermeasure device can render onto the display a directional arrow that points the user of the countermeasure device in the direction of the particular UAV. The countermeasure device can determine the orientation of the directional arrow rendered on the display based on the calculated location of the particular UAV and the measured location of the countermeasure device.

The display can allow users to visualize the direction and location of distant UAVs that were previously unobservable to the human eye due to their distance from the user. The countermeasure device can update in real-time the location, alignment, and directional arrow rendered on the display based on the movement of the user relative to the particular UAV. Once aligned, the countermeasure device can generate the attack signal to disable to UAV. If the countermeasure device loses alignment with the particular UAV, the countermeasure device can render the directional arrow in the direction of the particular UAV and prompt the user to realign the countermeasure device with the particular UAV by following the directional arrow.

The countermeasure device can interact with other deployed components of the disclosed system to perform particular actions. For example, the countermeasure device can communicate with one or more auxiliary devices to calibrate the sensors and components of the countermeasure device and/or the auxiliary devices. The display of the countermeasure device can provide information discussing the process to perform a calibration procedure of the countermeasure device and/or the auxiliary device. The countermeasure device can communicate with one or more client device and a computing environment.

The countermeasure device can communicate with the client device by establishing a wired or wireless communication. The countermeasure device can employ the client device (e.g., cellphone and/or tablet) to perform actions associated with the countermeasure device. For example, the countermeasure device can employ a display of the client device to render the one or more user interfaces associated with the countermeasure device. In another example, the countermeasure device can employ a client computing device local to the client device to perform calculations associated with the countermeasure device.

EXAMPLE EMBODIMENTS

Referring now to the figures, for the purposes of example and explanation of the fundamental processes and components of the disclosed systems and processes, reference is made to FIG. 1, which illustrates an example countermeasure environment 100. As will be understood and appreciated, the countermeasure environment 100 shown in FIG. 1 represents merely one approach or embodiment of the present concept, and other aspects are used according to various embodiments of the present concept.

The countermeasure environment 100 can illustrate a typical use case scenario of a countermeasure device 101. The countermeasure environment 100 can include a first unmanned aerial vehicle (UAV) 102 and a second UAV 103. The first UAV 102 can represent a hostile UAV traveling in a restricted airspace without permission from local authorities. The second UAV 103 can represent a friendly UAV traveling in the restricted airspace with proper permissions from local authorities. For example, the first UAV 102 and the second UAV 103 can be traveling in an airspace of an airport 104. To secure the airspace of the airport 104, the countermeasure device 101 can be deployed to jam communications between the first UAV 102 and a controller of the first UAV 102 (not pictured). The countermeasure device 101 can function as a handheld or stationary system that generates a noise signal (referred to herein as an attack signal 365) to disrupt the communication between the first UAV 102 and the controller of the first UAV 102.

The first UAV 102 and the second UAV 103 can be any particular unmanned flying system that is operated remotely by a user or computing system and an associated controller. For example, the first UAV 102 and the second UAV 103 can include but are not limited to military UAVs, commercial UAVs, civilian UAVs, and/or any particular flying object that is unmanned and controlled remotely. The first UAV 102 and the second UAV 103 can communicate with their respective controllers through wireless communications. For example, the wireless communication formed between the first UAV 102 and second UAV 103 and their respective controllers can include but is not limited to a 2.4 GHz channel, a 5.8 GHz channel, an LTE communication channel, a 4G network channel, a 5G network channel, satellite channels, a combination thereof, and/or any other particular form of wireless communication.

The countermeasure device 101 can typically be deployed in an area that has a restricted airspace. For example, the countermeasure device 101 can be deployed at a commercial airport, a military base, in a warzone, one or more government properties, and/or one or more private properties. As discussed in further detail herein, the countermeasure device 101 can include an antenna 317 a signal disruption component 321, a computing device 319, and a display 201, amongst other components, to generate the attack signal 365 (see FIG. 3 for further details).

In a particular use case scenario, the countermeasure device 101 can disable the first UAV 102. The countermeasure device 101 can function as a handheld directional noise generator. The countermeasure device 101 can be handheld such that a user can direct the attack signal 365 in the direction of the first UAV 102. The countermeasure device 101 can preside on the ground or an elevated surface pointing into the air. Typically, it can be extremely difficult for the user of a particular anti-drone jamming technology to firstly identify the first UAV 102, secondly aim the particular anti-drone jamming technology towards the first UAV 102, and thirdly maintain proper alignment with the first UAV 102 to jam its communication with its associated controller. For example, the first UAV 102 can be traveling at any of one or more radial distances 111A-D. The radial distances 111A-D can be an arbitrary metric used to visual represent distinct distances between the first UAV 102 and the countermeasure device 101. The radial distances 111A-D are not intended to limit the disclosure and are shown merely to represent qualitative distances between the first UAV 102 and the countermeasure device 101. Anywhere between a first radial distance 111A, a second radial distance 111B, and a third radial distance 111C, the first UAV 102 can be clearly identified by the user on the ground operating the countermeasure device 101. In the particular scenario where the first UAV 102 is flying between the third radial distance 111C and a fourth radial distance 111D, the first UAV 102 becomes increasingly difficult, if not impossible, for the user to identify with their eyes.

The countermeasure device 101 can employ the display 201 to assist in magnifying the view and identify the direction of the first UAV 102. For example, the countermeasure device 101 can employ the display 201 to assist in magnifying the view and identifying the direction of the first UAV 102 when the first UAV 102 is traveling at a distance that is unidentifiable by the user (e.g., past the third radial distance 111C and/or the fourth radial distance 111D). The countermeasure device 101 can render on the display 201 one or more maps and one or more virtual images of the first UAV 102 and the second UAV 103. The map can include a crosshair to help align the user with the first UAV 102. As discussed in further detail herein, the countermeasure device 101 can render other information and metrics on the display 201.

The countermeasure device 101 can request the user to approve a latching procedure on identifying the first UAV 102. The latching procedure can be defined as a process for identifying the direction of the first UAV 102 and aligning the countermeasure device 101 with the first UAV 102. The countermeasure device 101 can employ one or more sensors 315 to locate the first UAV 102. For example, the countermeasure device 101 can employ an onboard radio-frequency (RF) detector to identify the wireless communication between the first UAV 102 and its respective controller. The countermeasure device 101 can identify the communication type (e.g., 2.4 GHz channel, 5.8 GHz channel, LTE Channel) established between the first UAV 102 and its respective controller and the direction of the communication. By identifying the direction of the communication between the first UAV 102 and its respective controller, the countermeasure device 101 can calculate the position of the first UAV 102 in a three-dimensional space. Based on the calculated position of the first UAV 102, the countermeasure device 101 can render on the display 201 a direction (e.g., an arrow) that points the user of the countermeasure device 101 in the direction of the first UAV 102.

The countermeasure device 101 can use onboard positioning sensors (e.g., gyroscopes, accelerometers) to determine the directionality of the countermeasure device 101 relative to the first UAV 102. For example, the countermeasure device 101, based on the onboard positioning sensors, can calculate if the user is moving the countermeasure device 101 in the correct direction and alignment relative to the first UAV 102. As the user moves the countermeasure device 101, the countermeasure device 101 can continually check the calculated position of the first UAV 102 relative to the countermeasure device 101 and continually check that the countermeasure device is moving in the correct alignment and direction of the first UAV 102. The countermeasure device 101 can updating the direction rendered on the display 201 in real-time as the user positions the countermeasure device 101 in the right direction and alignment.

Once the countermeasure device 101 determined that the alignment between the countermeasure device 101 and the first UAV 102 is adequate, the countermeasure device 101 can render on the display 201 a request to approve a jamming procedure. The jamming procedure can be the process of distributing the attack signal 365 by the countermeasure device 101. The countermeasure device 101 can render a warning to inform the user that other devices that use the same communication type as the first UAV 102 may be affected by the attack signal 365. On approval, the countermeasure device 101 can employ the signal disruption component 321 to generate the attack signal 265 and the antenna 317 to distribute the attack signal 365. The countermeasure device 101 can render on the display 201 the current status of the jamming procedure and update the direction rendered on the display 201. The countermeasure device 101 can update the direction rendered on the display 201 to prevent the user from losing alignment with the first UAV 102. Once the UAV 102 has been removed from the restricted airspace, the countermeasure device 101 can stop distributing the attack signal 365.

The countermeasure device 101 can render multiple UAVs on the display 201. The countermeasure device 101 can distinguish between friendly UAVs and unknown UAVs. For example, based on the communication generated by the first UAV 102 and the second UAV 103, the countermeasure device 101 can determine that the first UAV 102 is the unknown UAV and the second UAV 103 is the friendly UAV. The display 201 can allow the user to select the UAV they would like to analyze and/or disable. For example, the countermeasure device 101 can render a list of UAVs in the airspace through the display 201. Continuing this example, the countermeasure device 101 can receive a request through the display 201 to provide information (e.g., directional information and property information) associate with the first UAV 102. The countermeasure device 101 can render property information (e.g., drone type, serial number) and directional information associated with the first UAV 102. The countermeasure device 101 can begin the latching procedure once the particular UAV has been selected for analysis and potential disablement.

Figure 2A:
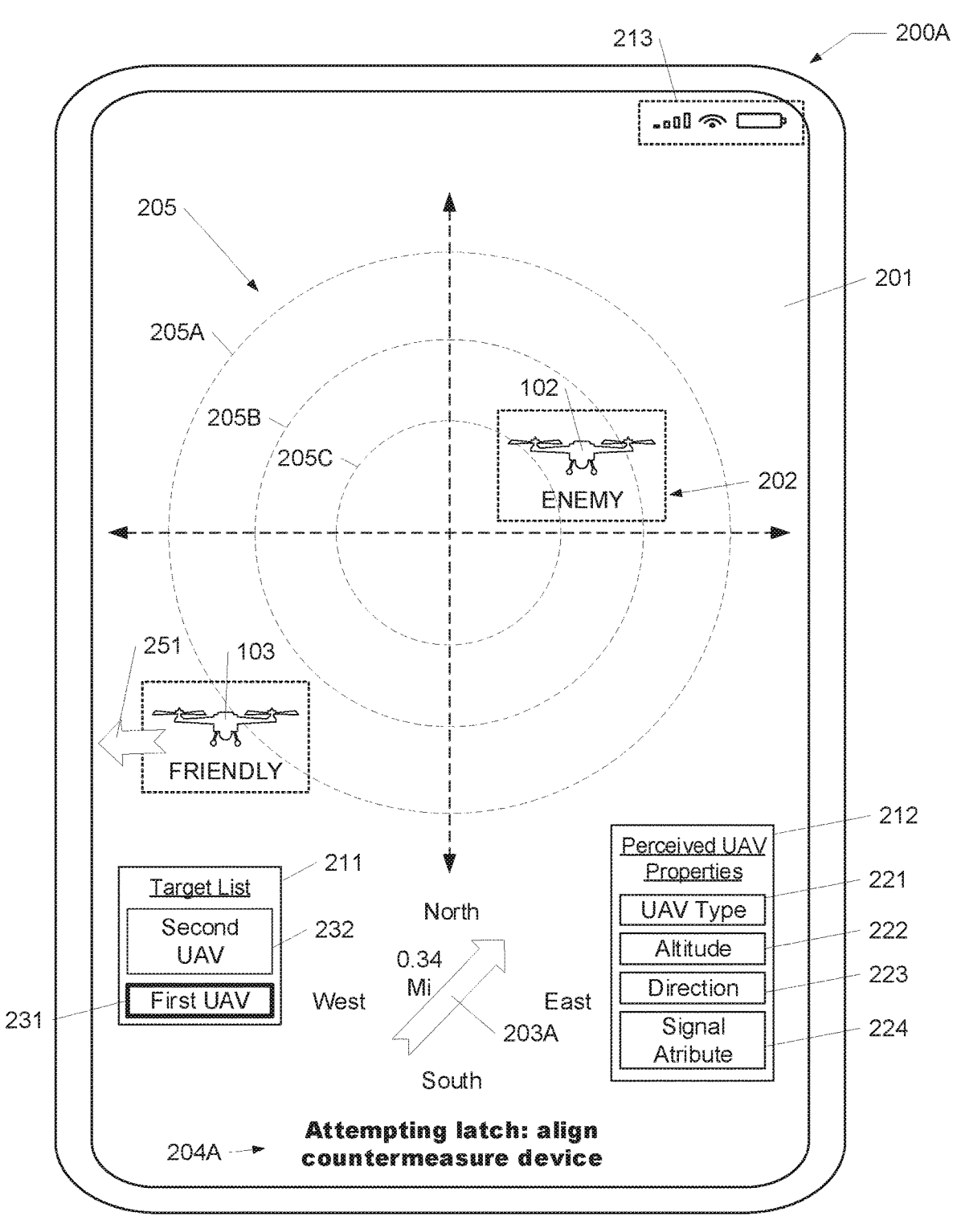
FIG. 2A illustrates a first user interface rendered on a display, according to one aspect of the present disclosure.

Referring now to FIG. 2A, illustrated is a first user interface 200A rendered on the display 201, according to one aspect of the present disclosure. The display 201 can be integrated into the countermeasure device 101. The display 201 can include any particular display. For example, the display 201 can include but is not limited to a liquid crystal display (LCD) displays, gas plasma-based flat panel displays, organic light emitting diode (OLED) displays, electrophoretic ink (E ink) displays, LCD projectors, a touchscreen display, or other types of display devices, etc.

The countermeasure device 101 can render the first user interface 200A on the display 201. The first user interface 200A can include a UAV identifier 202 (also referred to herein as an indicator), the first UAV 102, the second UAV 103, a direction 203A, a progress text 204A, and a crosshair 205, amongst other components. The first user interface 200A can illustrate various components and functionalities of the countermeasure device 101. The first user interface 200A can allow the user to visualize various functionalities, information, and/or properties associated with the one or more UAVs and the countermeasure device 101.

The UAV identifier 202 can display basic information associated with the first UAV 102 and/or the second UAV 103. For example, the UAV identifier 202 can include a dotted line box outlining the first UAV 102 and the second UAV 103. The dotted line box of the UAV identifier 202 can include a color such that the type of UAV is easily identifiable. For example, the UAV identifier 202 for the first UAV 102 can include a red dotted line box to illustrate an unknown/enemy UAV. Continuing this example, the UAV identifier 202 for the second UAV 103 can include a green dotted line box to illustrate a friendly UAV. The UAV identifier 202 can include a text identifier. The text identifier can identify the type of UAV identified by the countermeasure device 101. For example, the text identifier can include the term "Enemy" or any suitable synonym for unidentified UAVs and the term "Friendly" or any suitable synonym for friendly UAVs.

The UAV identifier 202 can include a virtual rendering on the first UAV 102 and/or the second UAV 103. The virtual rendering of the first UAV 102 and the second UAV 103 can be located on the screen relative to the alignment between the countermeasure device 101 and first UAV 102 and the second UAV 103, respectively. The UAV identifier 202 can include a directional arrow 251. In the case that the first UAV 102 and/or the second UAV 103 are out of alignment with the countermeasure device 101 such that the particular UAV cannot be displayed on the display 201, the countermeasure device 101 can render the directional arrow 251 to indicate the direction of movement for aligning with the particular UAV. The size of the direction arrow 251 can be proportional to how out of alignment the countermeasure device 101 is relative to the particular UAV. As the countermeasure device 101 moves in closer alignment with the particular UAV, the directional arrow 251 can shorten until eventually disappearing. Once the directional arrow 251 disappears, the countermeasure device can render the UAV identifier 202 and the particular UAV (e.g., first UAV 102, second UAV 103) within the crosshairs 205.

The countermeasure device 101 can render the crosshair 205 to align the countermeasure device 101 with the first UAV 102 and/or the second UAV 103. The countermeasure device 101 can render the first UAV 102 and/or the second UAV 103 within the crosshair when the first UAV 102 and/or the second UAV 103 are within a field of alignment of the countermeasure device 101. The field of alignment of the countermeasure device 101 can define an area in the direction of the antenna 317 of the countermeasure device 101. The crosshair 205 can include a first distance 205A, a second distance 205B, and a third distance 205C. The countermeasure device 101 can determine at least one threat proximate to the location of the countermeasure device 101. As used herein, the term proximate can refer to an object being within a particular distance, an object being within a distance that a signal strength associated with the object is within a predefined level, an object being at a distance determined by a machine learning/artificial intelligence algorithm, an object being within a sensing distance for a particular sensor (e.g., an audio or video sensor), an object having sensor measurements exceeding a particular threshold (e.g., noise or RF signal exceeding a particular threshold), and/or an object being within a particular airspace or portion of the particular airspace. For example, the countermeasure device 101 can determine that a threat is proximate if it is within a specific distance. As another example, the countermeasure device 101 can determine a threat is proximate if an RF signal associated with the threat exceeds a predefined threshold, the countermeasure device 101 is able to identify the threat in a video feed, and the threat is identified within a portion of airspace assigned to the countermeasure device. The countermeasure device 101 can be proximate to a threat when the threat is within a specific range of the countermeasure device 101. For example, the ability of a countermeasure device 101 to jam a signal can start at a first distance and improve as the threat moves closer. When a threat has limited communication or loses partial communications because of an attack from the countermeasure device 101 when initially entering into the range of the countermeasure device 101, the threat can take action to avoid the signal being jammed. For example, the threat can switch to a different frequency or different set of frequencies. As another example the threat may download a flight path to avoid requiring communications with a controller. The countermeasure device 101 can delay jamming the signal until it determines that the threat passes into a specific range of the countermeasure device 101 (e.g., is proximate to the countermeasure device 101), and then initiate jamming of the threat. The countermeasure device 101 can determine a threat is proximate based on a current scale of a map rendered on a display. The countermeasure device 101 can determine a threat is proximate based on a maximum scale of a map rendered on a display.

The countermeasure device 101 can render the first distance 205A on the display 201 with a scaled radius representing 5 miles from the center (e.g., the location of the countermeasure device 101). Continuing this example, the countermeasure device 101 can render the second distance 205B on the display 201 with a scaled radius representing 3 miles from the center. Further continuing this example, the countermeasure device 101 can render the third distance 205C on the display 201 with a scaled radius representing 1 mile from the center. In a first example, the crosshair 205 can represent a first map where the center indicated the location of the countermeasure device 101. In another example, the crosshair 205 can represent a second map where the center indicates the direct line of alignment with the countermeasure device 101. The countermeasure device 101 can render a particular UAV at the center of the crosshair 205 when the particular UAV has optimal alignment with the countermeasure device 101. The crosshair 205 can include any particular configuration that helps facilitate alignment between the particular UAV and the countermeasure device 101. The countermeasure device 101 can render the particular UAV within the crosshair 205 on the display 201 in real time as the countermeasure device 101 aligns with the particular UAV.

The first user interface 200A can include a target list 211 and a property list 212. The target list 211 can include one or more UAVs identified by the countermeasure device 101. The target list can include, for example, a first UAV 231 and a second UAV 232. The first UAV 231 can correspond with the first UAV 102 and the second UAV 232 can correspond with the second UAV 103. The target list 211 can include a selectable list of UAVs identified by the countermeasure device 101. On receiving a selection of a particular UAV through the target list 211 (e.g., selection through a touchscreen display), the countermeasure device 101 can focus on the particular UAV for further analysis and interactions. For example, the countermeasure device 101 can render the property list 212 associated with the particular selected UAV (e.g., the first UAV 231 and the first UAV 102). The countermeasure device 101 can render the direction 203A after the selection of the first UAV 231. The direction 203A can indicate the direction of alignment between the countermeasure device 101 and the first UAV 102. The direction 203A can include a coordinate plane and an arrow to identify the direction where the countermeasure device 101 must point to align with the first UAV 102. For example, the direction 203A can include a three-dimensional arrow to indicate the direction 203A in a three-dimensional space. As the countermeasure device 101 moves towards alignment with the first UAV 102, the direction 203A can move in accordance to the movement to the countermeasure device 101. The arrow rendered for the direction 203A can reduce in size as the countermeasure device 101 becomes more aligned with the first UAV 102. The direction 203A can function substantially similarly to the directional arrow 251.

The property list 212 can include a list of properties associated with the particular UAV. For example, the property list 212 can include a UAV type 221, a UAV altitude 222, a UAV direction 223, and a signal attribute 224. The countermeasure device 101 can include any particular property in the property list 212 than can be appreciated herein. The countermeasure device 101 can predict the UAV properties based on the communication of the particular UAV. For example, on identifying the communication of the first UAV 102 and identifying the properties associated with the first UAV 102, the countermeasure device 101 can render the property list 212 on the display 201. The UAV type 221 can include, for example, federal UAV classification type, UAV brand, UAV serial number, and/or UAV size. The countermeasure device 101 can calculate and render the perceived UAV altitude 222 of the first UAV 102. The countermeasure device 101 can calculate and render the UAV direction 223 of the first UAV 102 as coordinate units and/or any quantifiable direction schema. The countermeasure device 101 can determine the signal attributes 224 (e.g., communication type, signal strength, signal information) based on the intercepted communication of the first UAV 102.

On selection of the first UAV 231, the countermeasure device 101 can render the progress text 204A. The progress text 204A can identify the current processes being performed by the countermeasure device 101. For example, the progress text 204A can state "attempting latch: align countermeasure device." The progress text 204A can correspond, for example, with the latching procedure.

The first user interface 200A can include a status bar 213. The status bar 213 can include various statuses associated with the countermeasure device 101. For example, the status bar 213 can include a cellular connectivity status, a Wi-Fi connectivity status, a battery status, and/or any other information associated with the countermeasure device 101.

Figure 2B:
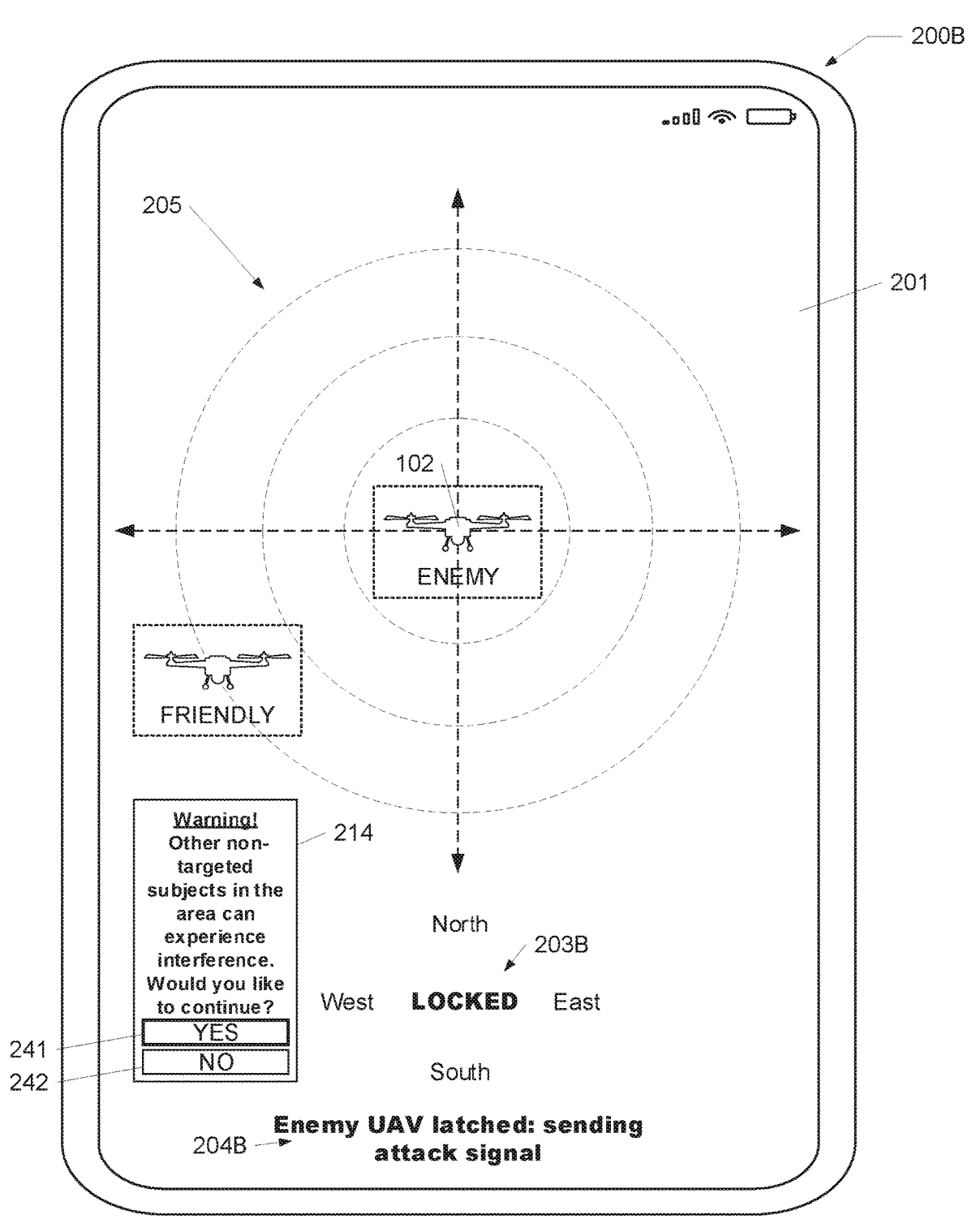
FIG. 2B illustrates a second user interface rendered on the display, according to one aspect of the present disclosure.

Referring now to FIG. 2B, illustrated is a second user interface 200B rendered on the display 201, according to one aspect of the present disclosure. The second user interface 200B can illustrate the latching procedure once the countermeasure device 101 is properly aligned with the first UAV 102. The second user interface 200B can be substantially similar to the first user interface 200A with different rendered information.

The countermeasure device 101 can render the second user interface 200B when the countermeasure device 101 has properly aligned with the first UAV 102. The countermeasure device 101 can calculate the position and direction of the antenna 317 and/or the countermeasure device 101 relative to the first UAV 102. Based on the position of the countermeasure device 101 as measured by the sensors 315 and the first UAV 102, the countermeasure device 101 can render the first UAV 102 in the center of the crosshair 205.

The second user interface 200B can include a second direction 203B, a second progress text 204B, and a warning notification 214. The second direction 203B can indicate that the countermeasure device 101 is properly aligned with the first UAV 102. For example, the countermeasure device 101 can render the second direction 203B as text (e.g., the term "Locked") indicating that the countermeasure device 101 is currently aligned with the first UAV 102. The countermeasure device 101 can render the second progress text 204B to indicate that the latching procedure is complete and the jamming procedure can commence. For example, the countermeasure device 101 can render the second progress text 204B as stating "Enemy UAV latched: sending attack signal."

Once the jamming procedure is ready to commence, the countermeasure device 101 can render the warning notification 214 on the display 201. The warning notification can include a confirmation 241 and a denial 242. The countermeasure device 101 can render the warning notification 214 to prompt the user that the attack signal 365 generated to disable the first UAV 102 has the potential to jam other non-UAV systems in the vicinity of the countermeasure device 101. The warning notification 214 can include the number of unintended targets that may be affected by the attack signal present in the particular area, where the unintended targets are, and the likelihood the attack signal will disable unintended targets, amongst other warnings. The countermeasure device 101 can bypass the warning notification 214 and generate the attack signal 365 if the countermeasure device 101 identifies that one or more unintended targets on the target list 211 are unaffected by the attack signal 365. The countermeasure device 101 can receive the confirmation 241 to begin the jamming procedure. On receiving the confirmation 241, the countermeasure device 101 can generate the attack signal 365 to disable the first UAV 102.

Figure 2C:
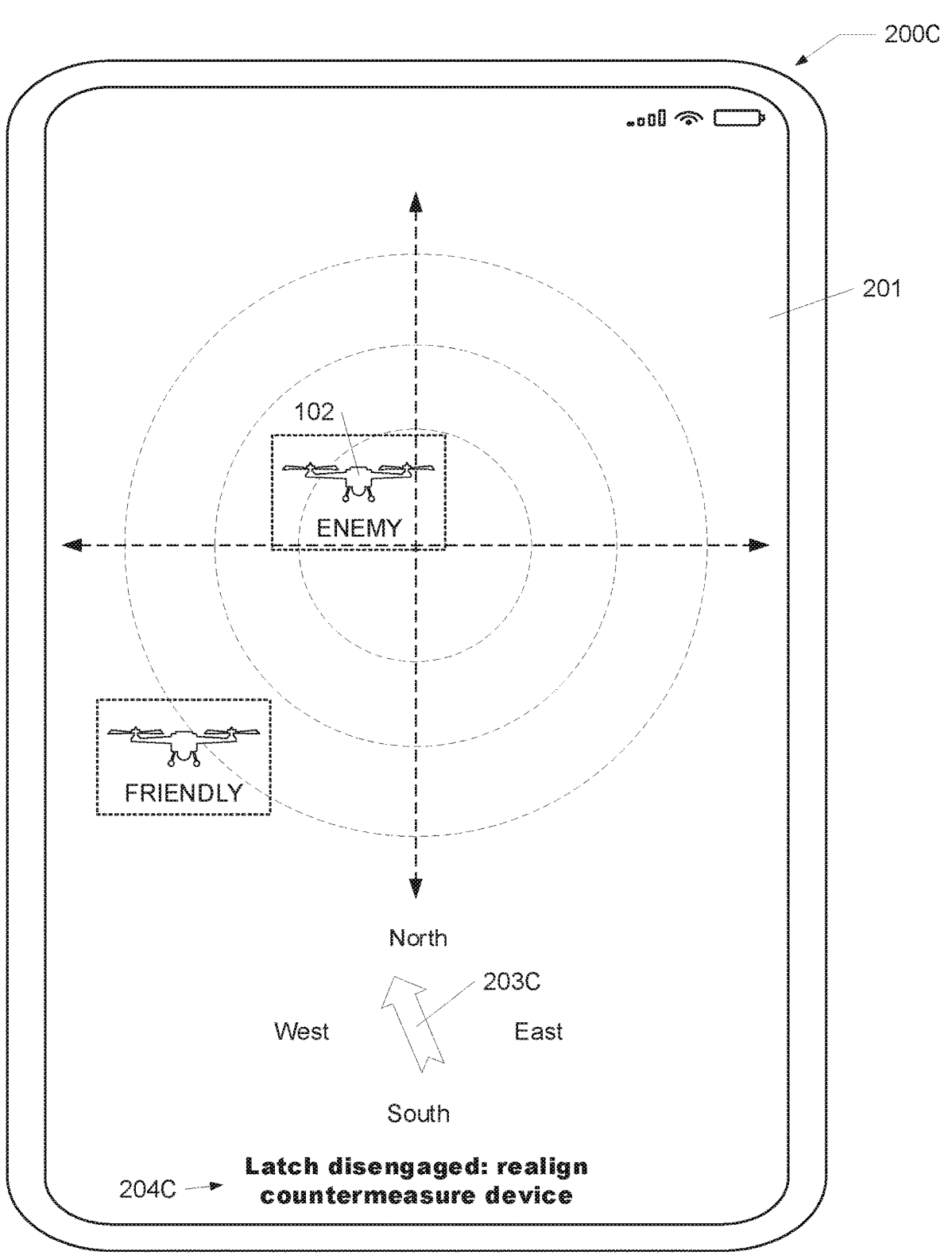
FIG. 2C illustrates a third user interface rendered on the display, according to one aspect of the present disclosure.

Referring now to FIG. 2C, illustrated is a third user interface 200C rendered on the display 201, according to one aspect of the present disclosure. The third user interface 200C can be substantially similar to the first user interface 200A and the second user interface 200B. The third user interface 200C can demonstrate a scenario where the countermeasure device 101 disengages with the first UAV 102 after losing alignment.

When alignment is lost between the countermeasure device 101 and the first UAV 102, the countermeasure device 101 can render the third user interface 200C to reestablish the latch and/or alignment between the countermeasure device 101 and the first UAV 102. The countermeasure device 101 can, in real-time, calculate a magnitude of misalignment between the countermeasure device 101 and the first UAV 102. The countermeasure device 101 can render a third direction 203C. The third direction 203C can indicate the magnitude and direction the countermeasure device 101 needs to move to reestablish a latch and/or alignment with the first UAV 102. The third direction 203C can function substantially similar to the direction 203A.

The countermeasure device 101 can render a third progress text 204C. The third progress text 204C can indicate that the countermeasure device 101 has disengaged with the first UAV 102 based on a misalignment between the countermeasure device 101 and the first UAV 102. For example, the countermeasure device 101 can render the third progress text 204C by stating, "Latch disengaged: realign countermeasure device."

Figure 2D:
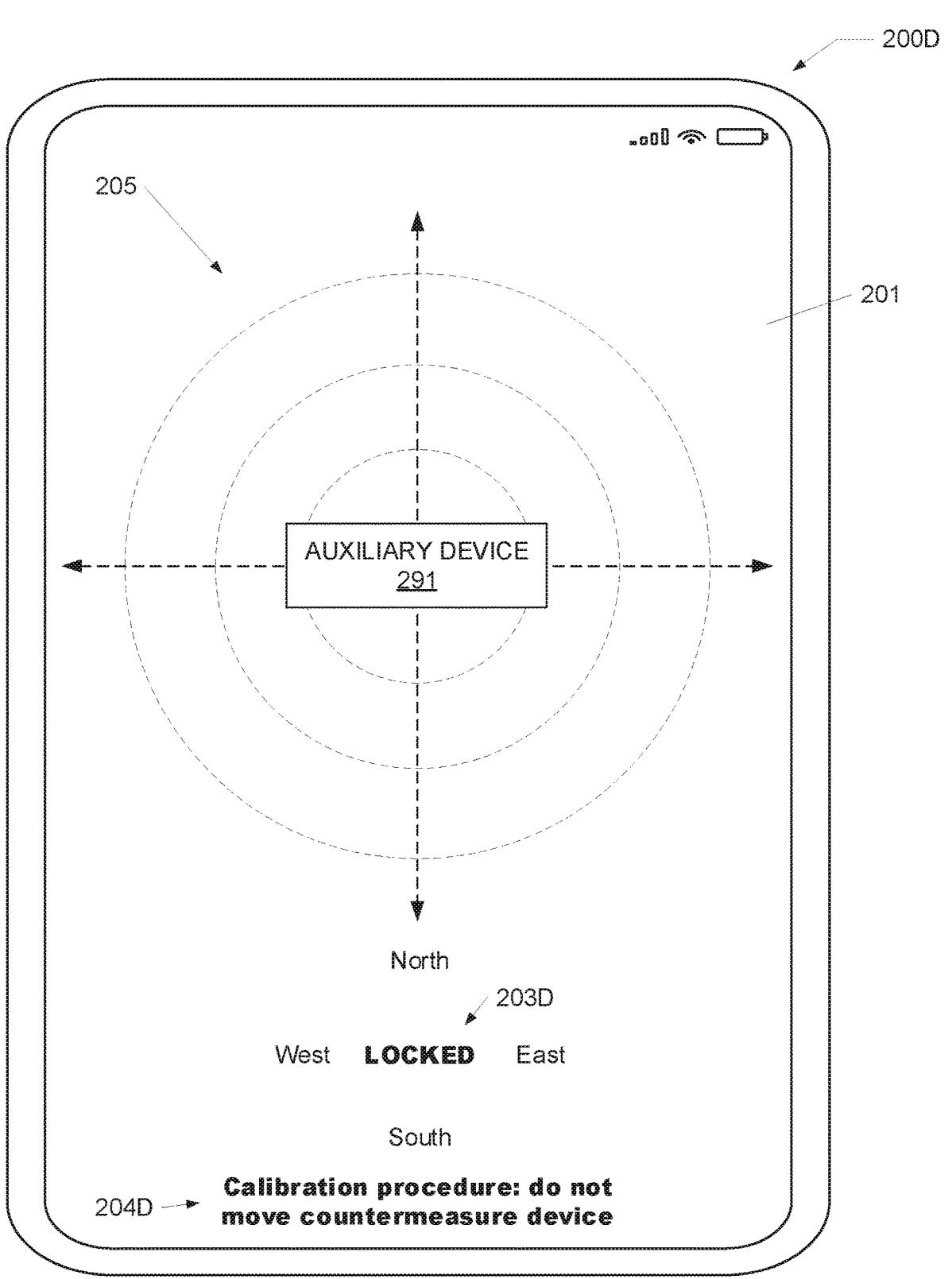
FIG. 2D illustrates a fourth user interface rendered on the display, according to one aspect of the present disclosure.

Referring now to FIG. 2D, illustrated is a fourth user interface 200D rendered on the display 201, according to one aspect of the present disclosure. The fourth user interface 200D can illustrate a calibration procedure between the countermeasure device 101 and an auxiliary device 291. The auxiliary device 291 can be a second countermeasure device and/or a calibration tool. For example, the auxiliary device 291 can be a second handheld countermeasure device substantially similar to the countermeasure device 101. In another example, the auxiliary device 291 can include a mounted, motor driven, and/or robotic countermeasure device. In yet another example, the auxiliary device 291 can include the calibration tool used to calibrate the countermeasure device 101.

The calibration procedure can include a technique for calibrating the countermeasure device 101 and/or the auxiliary device 291. The auxiliary device 291 can be located a known distance and direction away from the countermeasure device 101. The countermeasure device 101 can align with the auxiliary device 291 such that the countermeasure device 101 renders the auxiliary device 291 at the center of the crosshair 205. Once aligned, the countermeasure device 101 can render a fourth direction 203D and a fourth progress text 204D. The fourth direction 203D can indicate that the countermeasure device 101 is aligned and latched with the auxiliary device 291. The fourth progress text 204D can state that the calibration procedure is underway and to request maintaining the alignment between the countermeasure device 101 and the auxiliary device 291.

The calibration procedure can function as a technique to calibrate all sensors 315 and auxiliary sensors 329 on the countermeasure device 101 and the auxiliary device 291, respectively. For example, the countermeasure device 101 can align with the auxiliary device 291 at a known distance, direction, and location away from the auxiliary device 291. Base on the known data, the countermeasure device 101 and the auxiliary device 291 can check their respective sensors to confirm that the known distances, directions, and locations are correct. The countermeasure device 101 and/or the auxiliary device 291 can implement adjustments to their respective sensors to ensure accuracy during future use. The countermeasure device 101 can provide ground data, a calibration signal, and instructions to the auxiliary device 291. The ground data can be defined as data generated by one or more sensors 315 of the countermeasure device 101. The countermeasure device 101 can send ground data to the auxiliary device 291, such that the auxiliary device 291 can use the ground data as a baseline to compare incoming data recorded by the auxiliary sensors 329. The auxiliary device 291 can employ the ground data from the countermeasure device 101 such that the auxiliary device 291 knows what the auxiliary sensors 329 should be sensing. The calibration process discussed herein can be reversed such that the auxiliary device 291 sends ground data, the calibration signal, and instructions to the countermeasure device 101. The countermeasure device 101 can use the ground data, the calibration signal, and the instructions to calibrate the sensors 315.

Figure 3:
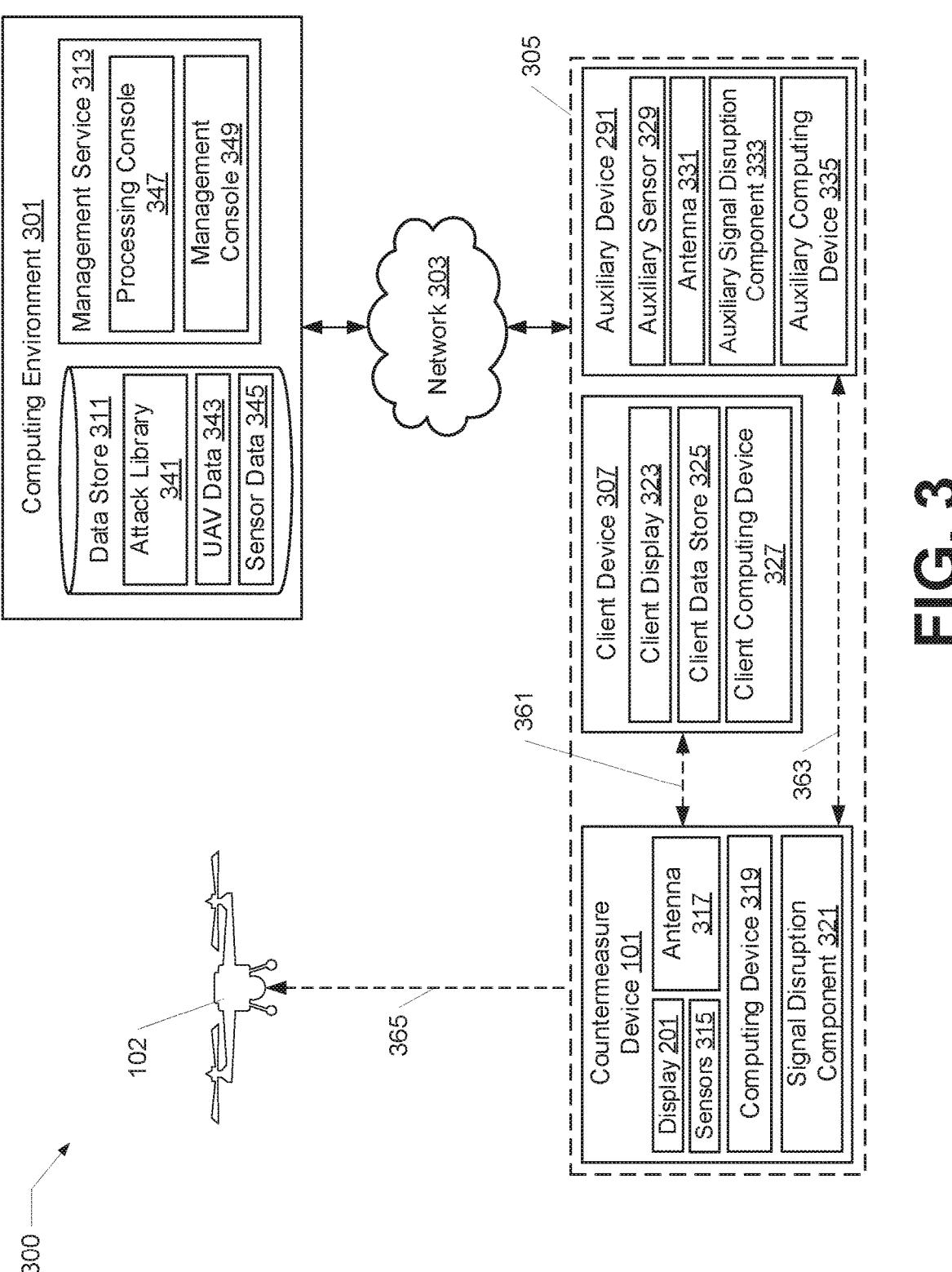
FIG. 3 illustrates a networked environment, according to one aspect of the present disclosure.

Referring now to FIG. 3, illustrated is a networked environment 300, according to one aspect of the present disclosure. The networked environment 300 can include a computing environment 301, the countermeasure device 101, a client device 307, and the auxiliary device 291, which can be in data communication with each other via a network 303. The network 303 can include, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

The countermeasure device 101, the client device 307, and the auxiliary device 291 can be referred to herein as a deployed system 305. The deployed system 305 can refer to all components deployed at a particular location for protecting a particular airspace. The deployed system 305 can communicate with the computing environment 301 over the network 303. For example, the deployed system 305 can be located at the airport 104 while the computing environment 301 can be located at a remote server location. The countermeasure device 101 can communicate with the client device 307 and the auxiliary device 291 using a first communication 361 and a second communication 363, respectively. The first communication 361 and the second communication 363 can be substantially similar to the network 303. The first communication 361 and the second communication 363 can function as local connections with the countermeasure device 101. For example, the first communication 361 and the second communication 363 can include a Bluetooth connection established with the countermeasure device 101. In another example, the first communication 361 and the second communication 363 can include a wired connection established with the countermeasure device 101.

The computing environment 301 can include, for example, a server computer or any other system providing computing capability. Alternatively, the computing environment 301 can employ more than one computing devices that can be arranged, for example, in one or more server banks or computer banks or other arrangements. Such computing devices can be located in a single installation or can be distributed among many different geographical locations. For example, the computing environment 301 can include one or more computing devices that together can include a hosted computing resource, a grid computing resource, and/or any other distributed computing arrangement. In some cases, the computing environment 301 can correspond to an elastic computing resource where the allotted capacity of processing, network, storage, or other computing-related resources can vary over time.

The computing environment 301 can function as a centralized computing source for the deployed system 305. For example, the computing environment 301 can perform any particular processing functionalities for the deployed system 305, manage data for the deployed system 305, and distribute data across the network 303. The computing environment 301 can include a data store 311. The data stored in the data store 311 can includes, for example, list of data, and potentially other data. The data store 311 can include but is not limited to an attack library 341, a UAV data 343, and a sensor data 345.

The attack library 341 can include any particular information for generating accurate attack signals 365 to disable the first UAV 102. For example, the attack libraries 341 can include one or more protocol specific attacks signals 365 for each particular communication type and/or each particular UAV type. The attack library 341 can include a list of signal types for interrupting the communication between the first UAV 102 and the associated controller. For example, the Attack library can include one or more digital noise configurations that are associated with a particular drone type.

The UAV data 343 can include any particular data associated with the one or more UAVs. For example, the UAV data 343 can include UAV types, UAV manufactures, known UAV communication protocols, known UAV defense mechanisms, UAV size, UAV weight, UAV speed, and/or any other information associated with the one or more UAVs.

The sensor data 345 can include any data collected through the sensors 315 and/or the auxiliary sensors 329. The sensor data 345 can include for example, countermeasure device positioning information, client device position information, calibration information, calibration history, attack logs, attack success and failure metrics, geo-spatial data, camera data (e.g., videos, photos), directional information, and/or any other information associated with the auxiliary device 291 and the countermeasure device 101.

Various applications and/or other functionalities can be executed in the computing environment 301 according to various embodiments. Also, various data can be stored in a data store 311 that can be accessible to the computing environment 301. The data store 311 can be representative of one or more of data stores 311 as can be appreciated. The data stored in the data store 311, for example, can be associated with the operation of the various applications and/or functional entities described below.

The components executed on the computing environment 301, for example, can include list of applications, and other applications, services, processes, systems, engines, or functionality not discussed in detail herein. The computing environment 301 can include a management service 313. The management service 313 can function as the central computing infrastructure of the computing environment 300. The management service 313 can include a processing console 347 and a management console 349.

The processing console 347 can function as the central processing system for the networked environment 300. For example, the processing console 347 can perform all calculations associated with aligning the countermeasure device 101 and the first UAV 102, perform all calculations for generating the one or more attack signals 365, and/or perform any particular process associated with the functionality of the countermeasure device 101 and/or any other deployed system 305 device.

The management console 349 can manage all data distribution, data collection, and data storage needs associated with the networked environment 300. For example, the management service 313 can receive data from the deployed system 305, store data in the data store 311, send data to components within the computing environment 301 and the network 303, and/or any other data distribution and management requirement of the networked environment 300.

The deployed system 305 can include the countermeasure device 101, the client device 307, and the auxiliary device 291. The countermeasure device 101 can generate the attack signal 365 to disable the first UAV 102. The client device 307 can be any particular computing device (e.g., tablet, cellphone) that can connect to the countermeasure device 101. The auxiliary device 291 can function as a calibration system and/or a standalone countermeasure device substantially similar to the countermeasure device 101.

The client device 307 can be representative of one or more client devices that can be coupled to the network 303 and/or to the countermeasure device 101 through the first communication 361. The client device 307 can include, for example, a processor-based system such as a computer system. Such a computer system can be embodied in the form of a desktop computer, a laptop computer, personal digital assistants, cellular telephones, smartphones, web pads, tablet computer systems, or other devices with like capability. The client device 307 can include a client display 323. The client display 323 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 307 can be configured to execute various applications and/or functionalities. A client computing device 327, for example, can access content served up by the computing environment 300 and/or the countermeasure device 101, thereby rendering the one or more user interfaces 200A-D on the client display 323. To this end, the client device 307 can include, for example, a browser, a dedicated application, etc., and the one or more user interface 200A-D can include a network page, an application screen, etc. The client device 307 can execute applications such as, for example, email applications, social networking applications, word processors, spreadsheets, and/or other applications.

The client device 307 can include any particular mobile device used to connect with the countermeasure device 101. For example, the countermeasure device 101 and the client device 307 can establish the first communication 361 through a Universal Serial Bus (USB) connection. The client device 307 can render the first user interface 200A, the second user interface 200B, the third user interface 200C, and the fourth user interface 200D on the client display 323. The client device 307 can function as the main or complimentary computing and display system for the countermeasure device 101. In one example, the countermeasure device 101 does not include the display 201, the sensors 315, the computing device 319, or a combination thereof. Continuing this example, the countermeasure device 101 can connect to the client device 307 to employ the client display 323, the client computing device 327, and onboard sensors of the client device 307 to implementing functionalities associated with the countermeasure device 101.

The client device 307 can include one or more onboard sensors for tracking data associated with the countermeasure device 101. For example, the client device 307 can send the countermeasure device 101 various location data associated with the client device 307. Continuing this example, the countermeasure device 101 can employ the location data of the client device 307 to determine the alignment and orientation of the countermeasure device 101 relative to the first UAV 102.

The client device 307 can include a client data store 325 and the client computing device 327. The client data store 325 can be a data store that function substantially similarly to the data store 311. For example, the client data store 325 can include the same data as the data stored in the data store 311. The client computing device 327 can function as the central processing unit of the client device 307. The client computing device 327 can function substantially similarly to the management service 313 and the computing device 319 of the countermeasure device 101.

The auxiliary device 291 can include a stationary countermeasure device and/or the calibration tool. The auxiliary device 291 can include the auxiliary sensors 329, an antenna 331, an auxiliary signal disruption component 333, and an auxiliary computing device 335. The auxiliary device 291 can function as a system to jam the communications for one or more UAVs and/or as a calibration system for the countermeasure device 101. The auxiliary sensors 329 can include any particular sensor installed onto the auxiliary device 291. The auxiliary sensors 329 can be substantially similar to the sensors 315. The auxiliary computing device 335 can function as the central processing unit for the auxiliary device 291. The auxiliary computing device 335 can function substantially similarly to the computing device 319, the client computing device 327, and/or the management service 313. The auxiliary signal disruption component 333 can generate the attack signal 365 and propagate the attack signal 365 through the antenna 331.

In a particular use case scenario, the countermeasure device 101 can employ the auxiliary device 291 to generate the attack signal 365. For example, the countermeasure device 101 can determine, based on proximity, known obstructions, and/or any other factor, that the auxiliary device 291 is better suited to generate the attack signal 365 and jam the first UAV 102. The countermeasure device 101 can determine that the particular attack signal 365 is ready to be transmitted. The processing console 347 can transmit a request to emit a transmission to the auxiliary device 291 comprising transmission metadata. The countermeasure device 101 can receive a command to transmit from the auxiliary device 291, wherein the particular attack signal 365 is transmitted subsequent to receiving the command.

The auxiliary device can include a UAV tracking system. The UAV tracking system can be an array of auxiliary sensors 329 used to track the location of the first UAV. For example, the UAV tracking system can include at least 3 auxiliary sensors 329 used to identify the location of the first UAV 102 by using triangulation. On identifying that the first UAV 102 is in the particular airspace, the UAV tacking system can generate at least on message identifying the UAV. The countermeasure device 101 can determine that the first UAV 102 is within the particular airspace by receiving a message from the UAV tracking system indicating that the UAV is within the particular airspace.

As discussed in detail herein, the countermeasure device 101 can generate the attack signal 365 for jamming the communication of the first UAV 102 and/or any other particular UAV. The countermeasure device 101 can include the display 201, the sensors 315, the antenna 317, the computing device 319, and the signal disruption component 321.

The sensors 315 can include any particular sensor used by the countermeasure device 101, the client device 307, and/or the computing environment 301. The sensors 315 can include but are not limited to RF sensors, spectrum analyzers, electromagnetic signal sensors, gyroscopes, accelerometers, Global Positioning Service (GPS) sensors, cameras, microphones, and/or any particular adequate sensor for the countermeasure device 101.

The antenna 317 can be in electrical communication with the signal disruption component 321 such that when the countermeasure device 101 commences the jamming procedure, the signal disruption component 321 can generate the attack signal 365 and propagate the attack signal 365 through the antenna 317 towards the first UAV 102. The signal disruption component 321 can include analog systems, digital systems, or a combination thereof to generate the one or more attack signals 365. The signal disruption component can generate a cone jam signal for the attack signal. The cone jam signal for the attack signal can include more than two different narrow band frequencies used to jam the communication of the first UAV 102. For example, the cone jam generated by the signal disruption component 321 can include ten narrow band signal intended to target ten different communication channels of the first UAV 102.

The computing device 319 can function as the central processing component of the countermeasure device 101. The computing device 319 can be substantially similar to the management service 313, the client computing device 327, and the auxiliary computing device 335. The computing device 319 can perform similar functionalities as the management service 313, the client computing device 327, and the auxiliary computing device 335, and vise-versa. For example, the computing device 319 can measure the distances, locations, and directions between the countermeasure device 101 and the first UAV 102. Further continuing the previous example, the computing device 319 can calculate the orientation of the direction 203A, the first UAV 102, and/or the third direction 203C such that when rendered onto the display 201, they are accurately rendered.

Next, a general description of the operation of the various components of the networked environment 300 is provided. To begin, client device 307 can include a tracking application. The countermeasure device 101 when connected to the client device 307 and employ the associated data of the tracking application to identify UAVs, locate UAVs, jam UAVs, and perform other actions. For example, the client device through the tracking application can render the target list 211. Continuing this example, the client device 307 can receive a UAV selection for analysis and potential disablement. Further continuing this example, the countermeasure device 101 can engage the particular UAV by generating the attack signal 365.

The countermeasure device 101, the auxiliary device 291, and/or the processing console 347 can identify an orientation corresponding to the countermeasure device 101. For example, the processing console 347 can receive orientation data recorded by the sensors 315 associated with the countermeasure device 101 to identify the orientation of the countermeasure device 101. The sensors 315 can generate orientation data. The orientation data can include any data that quantifies the orientation of the countermeasure device 101. For example, the orientation data can include but is not limited to acceleration data recorded by accelerometers, GPS data recorded by GPS sensors, angular velocity data recorded by gyroscopes, output voltage data to measure the earth's magnetic field recorded by hall effect sensors or magnetic field sensors, and/or any other orientation data gathered by one or more sensors 315 of the countermeasure device 101. The countermeasure device 101 can include one or more magnetic sensor and one or more accelerometers used to generate magnetic field data and acceleration data. Based on the magnetic field data and the acceleration data stored in the orientation data, the countermeasure device 101 and/or the processing console 347 can determine a tilt of the countermeasure device 101 and a direction of magnetic north relative to the countermeasure device 101. The countermeasure device 101 and/or the processing console 347 can employ GPS data to locate the countermeasure device 101 at a particular location on earth, use the acceleration data to determine the tilt of the countermeasure device 101, and use the magnetic field data to determine the direction of the countermeasure device 101. The countermeasure device 101 and/or the processing console 347 can determine the orientation using one or more of the orientation data generated by the sensors 315.

The countermeasure device 101, the auxiliary device 291, and/or the processing console 347 can compute a position of the first UAV 102 relative to an aiming direction of the countermeasure device 101. The countermeasure device 101, the auxiliary device 291, or a combination thereof can determine the position of the first UAV 102. For example, the countermeasure device 101, the auxiliary device 291, or a combination thereof can determine the position of the first UAV 102 based on the communication (e.g., communication strength, communication direction) generated by the first UAV 102 and/or its associated controller. In another example, one or more countermeasure device 101, one or more auxiliary device 291, or a combination thereof can form a network to identify the position of the first UAV 102 using triangulation. The countermeasure device 101 can identify the orientation of the countermeasure device 101 and the position of the first UAV 102 within a three-dimensional space. The orientation of the countermeasure device 101 can include an associated aiming direction. The countermeasure device 101 can continuously update the orientation (e.g., aiming direction) of the countermeasure device 101 relative to the three-dimensional space and continuously determine the position of the first UAV 102 within the three-dimensional space. The countermeasure device 101, in real-time, can render on the display 201 the orientation of the countermeasure device 101 (e.g., rendering the user interfaces 200A-D to populate anything detected in the aiming direction of the countermeasure device 101) and the position of the first UAV 102 (e.g., populating the directional arrow 251 in the direction of the first UAV 102 relative to the countermeasure device 101).

In response to the position of the first UAV 102 being within the aiming direction of the countermeasure device 101, the countermeasure device 101 can render the indicator of the first UAV 102 on the display 201 at a virtual position corresponding to the position of the first UAV 102. The countermeasure device 101 and/or the processing console 347 can determine that the orientation of the countermeasure device 101 is in line with the position of the first UAV 102. The countermeasure device 101 and/or the processing console 347 can determine based on the orientation data of the countermeasure device 101 and the position data of the first UAV 102 that the virtual position of the first UAV 102 in the three dimensional space is in line with the aiming direction of the countermeasure device 101. On determining that the first UAV 102 is in line with the aiming direction with the countermeasure device 101, the countermeasure device 101 can render the UAV identifier 202 on the display 201. The countermeasure device 101 can render the UAV identifier 202 on the display 201 within the crosshair 205.

In various embodiments, it is possible to have more than one countermeasure device 101 deployed at the particular location. The one or more countermeasure devices 101 can be assigned to a particular client device 307 to track the performance of the user. For example, the countermeasure devices 101 can take part in a gamification of UAV jamming. The particular countermeasure device 101 with the most successful UAV disablements can be ranked the highest amongst other countermeasure devices 101 and their associated users.

The computing device 319 and/or the management service 313 can keep track of jamming history. By keeping track of jamming history, the management service 313 can better understand what actions lead to greater jamming of one or more UAVs. For example, the management service 313 can generate one or more reports for each particular countermeasure device 101 to identify statistics for training purposes (e.g., how long until latch achieved? how long was latch maintained? was the UAV disabled?).

The computing device 319 and/or the management service 313 can generate recommendations for jamming particular UAVs. For example, the computing device 319 and/or the management service 313 can generate a ranking that ranks the UAVs by likelihood of disablement. The computing device 319 and/or the management service 313 can generate the ranking based off of historical jamming data, availability of attack data, and/or any other particular gathered metric. The computing device 319 and/or the management service 313 can recommend a location to deploy the countermeasure device 101. For example, the countermeasure device 101 and/or the client device 307 can employ the GPS sensor to identify the location of the countermeasure device 101. The countermeasure device 101 can render a second map on the display 201 indicating the recommended location for the deployment of the countermeasure device 101 relative to the first UAV 102. In another example, the computing device 319 and/or the management service 313 can determine the adequate range of the attack signal relative to the first UAV 102. Continuing this example, the computing device 319 and/or the management service 313 can render on the display 201 and/or client display 323 a recommended distance from the countermeasure device 101 to be from the first UAV 102.

The client device 307 can include augmented reality systems. For example, the client device 307 can include smart headsets that render the crosshairs 205 into the display. Continuing this example, the user can see the crosshair 205 and the UAV identifier 202 in the smart headset based on the orientation of the client device 307 and/or the countermeasure device 101. The countermeasure device 101 can employ cameras (e.g., from the sensors 315) to render a camera feed on the display 201 and/or the client display 323. The countermeasure device 101, the processing console 347, the client computing device 327, and/or the auxiliary computing device 335 can augment the camera feed by rendering an overlay onto the display 201 and/or the client display 323. The overlay can be based on at least one of: a position of the first UAV 102, a type of signal being emitted, proximate wireless signals, proximate UAVs, or proximate countermeasure devices 101. For example, the overlay can include the target list 211 and/or property list 212.

The countermeasure device 101 can generate alert histories to identify locations where disablement was successful and/or unsuccessful. For example, the countermeasure device 101 can send the alert histories to the computing environment 301 to generate a report identifying locations and or configurations that were successful at disabling UAVs.

The countermeasure device 101 can be mounted to a robotic tripod or attachment system. The robotic tripod can be powered and connected to the networked environment 300 such that the direction of the first UAV 102 is transmitted to the robotic tripod and the robotic tripod moves in real-time to align the countermeasure device 101 with the first UAV 102.

Figure 4:
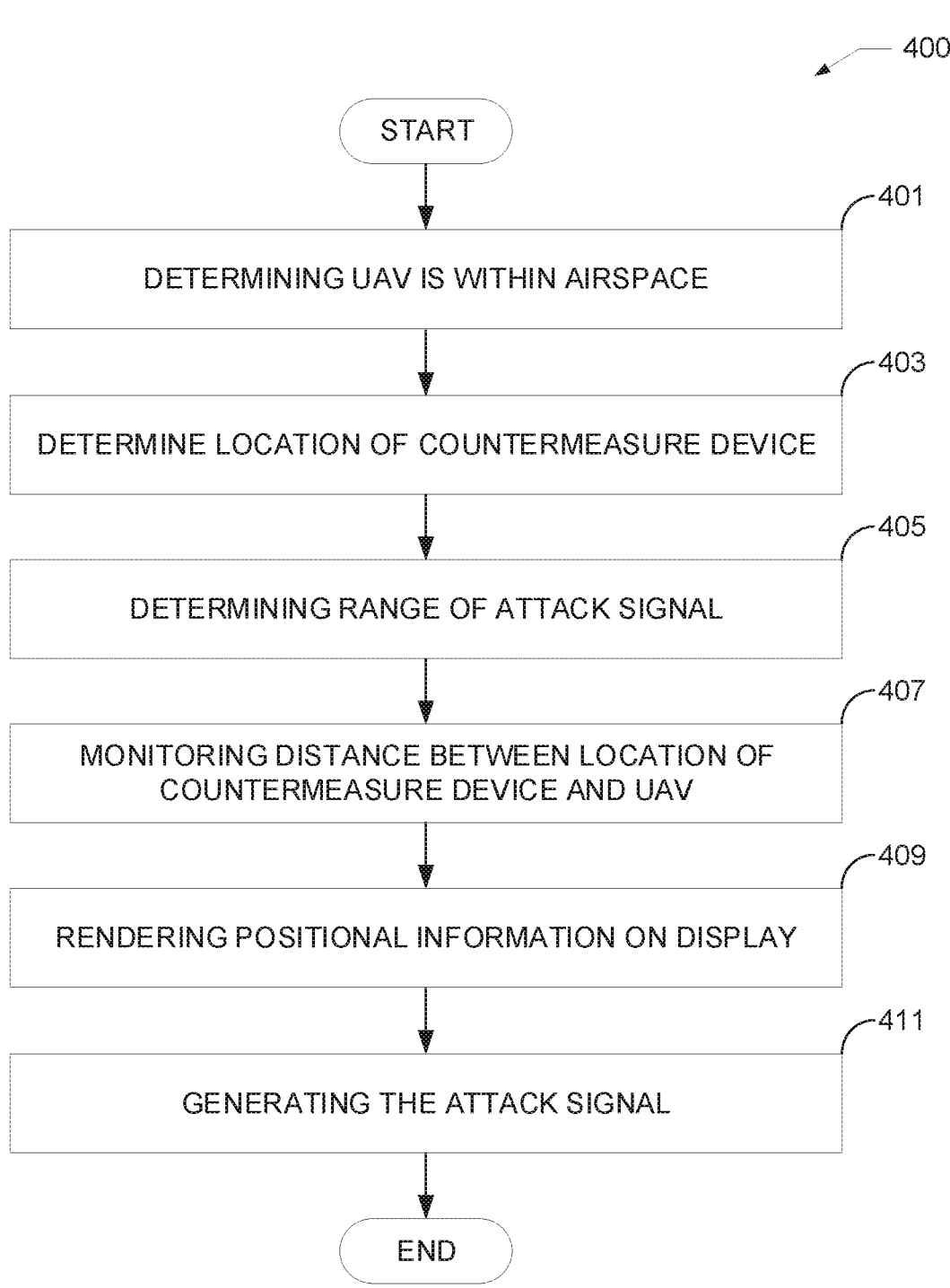
FIG. 4 illustrates a flowchart of a process, according to one aspect of the present disclosure.

Referring now to FIG. 4, illustrated is a flowchart of a process 400, according to one aspect of the present disclosure. The process 400 can demonstrate a technique for identifying a particular unknown UAV, aligning the countermeasure device 101, and generating the attack signal 365. The process 400 can be performed by any particular system on the networked environment.

At box 401, the process 400 can include determining that the first UAV 102 is within a particular airspace. The countermeasure device 101 and/or the auxiliary device 291 can determine that the first UAV 102 is within the particular airspace. For example, the countermeasure device 101 can determine that the first UAV 102 is within the particular airspace based on the communication type and the strength of the particular communication signal. In another example, the auxiliary device 291 can employ the UAV tracking system with various auxiliary sensors 329 to identify that the first UAV is in the particular airspace.

At box 403, the process 400 can include determining a location corresponding to the countermeasure device 101. The countermeasure device 101 can determine the location corresponding to the countermeasure device 101. For example, the countermeasure device 101 can include onboard GPS sensors to determine the location of the countermeasure device 101. In another example, the countermeasure device 101 can connect with the client device 307. The countermeasure device 101 can employ the onboard GPS sensor of the client device 307 to determine the location of the countermeasure device 101.

At box 405, the process 400 can include determining a range of the particular attack signal 365. The computing environment 301 can determine the range of the particular attack signal 365. The computing environment 301 can receive UAV property data from the countermeasure device 101 and/or the auxiliary device 291. The computing environment 301 can compare the UAV property data with the attack library 341. On identifying the particular attack signal 365 associated with the first UAV 102, the computing environment 301 can determine the range of the particular attack signal 365.

At box 407, the process 400 can include monitor a distance between the location of the countermeasure device 101 and a location of the first UAV 102. The countermeasure device 101 can monitor the distance between the location of the countermeasure device 101 and a location of the first UAV 102. The countermeasure device 101, based on the GPS data, can update the location of the countermeasure device 101 in real-time. The countermeasure device 101 can continually receive from the UAV tracking system and through the second communication 363 updated location data of the first UAV 102. The countermeasure device 101 can find the distance between the countermeasure device 101 and the first UAV 102 by measuring a difference in the measured location of the countermeasure device 101 and the measured location of the first UAV 102.

At box 409, the process 400 can include rendering positional information comprising the distance on the display 201. The countermeasure device 101 can render positional information comprising the distance on the display 201. For example, the countermeasure device 101 can render the direction 203A with the corresponding distance between the countermeasure device 101 and the first UAV 102.

At box 411, the process 400 can include in response to the distance being less than the range of the particular attack signal 365, generating, via the signal disruption component 321 and the at least one antenna 317, the particular attack signal 365. The countermeasure device 101 in response to the distance being less than the range of the particular attack signal 365, can generate, via the signal disruption component 321 and the at least one antenna 317, the particular attack signal 365. The signal disruption component 321 can generate the attack signal 365 and can send the attack signal 365 electronically to the antenna 317 for distribution towards the first UAV 102.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed innovations may be described in the context of computer-executable instructions, such as program modules or engines, as described earlier, being executed by computers in networked environments. Such program modules are often reflected and illustrated by flow charts, sequence diagrams, example screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed innovation are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are example and other mechanisms of establishing communications over wide area networks or the Internet may be used.

While various aspects have been described in the context of a preferred embodiment, additional aspects, features, and methodologies of the claimed innovations will be readily discernible from the description herein, by those of ordinary skill in the art. Many embodiments and adaptations of the disclosure and claimed innovations other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

The embodiments were chosen and described in order to explain the principles of the claimed innovations and their practical application so as to enable others skilled in the art to utilize the innovations and various embodiments and with various modifications as are suited to the particular use contemplated. Alternative embodiments will become apparent to those skilled in the art to which the claimed innovations pertain without departing from their spirit and scope. Accordingly, the scope of the claimed innovations is defined by the appended claims rather than the foregoing description and the example embodiments described therein.

What is claimed is:

1. A method, comprising:
determining, via one of one or more computing devices, that an unidentified aerial vehicle (UAV) is within a particular airspace;
determining, via one of the one or more computing devices, a GPS location of a countermeasure device;
determining, via one of the one or more computing devices, a range of a particular attack signal generated by a signal disruption component and at least one antenna of the countermeasure device;
monitoring, via one of the one or more computing devices, a distance between the GPS location of the countermeasure device and a location of the UAV;
rendering, via one of the one or more computing devices, positional information comprising the distance on a display of the countermeasure device; and
in response to the distance being less than the range of the particular attack signal, generating, via the signal disruption component and the at least one antenna of the countermeasure device, the particular attack signal comprising a noise signal.

2. The method of claim 1, further comprising:
determining, via one of the one or more computing devices, that the UAV is no longer within the range of the countermeasure device; and
in response to determining that the UAV is no longer within the range, stopping generation of the particular attack signal.

3. The method of claim 1, wherein a command to generate the particular attack signal originates from a UAV tracking system.

4. The method of claim 1, further comprising:
identifying, via one of the one or more computing devices, an orientation corresponding to the countermeasure device;
computing, via one of the one or more computing devices, a position of the UAV relative to an aiming direction of the countermeasure device; and
in response to the position being within the aiming direction, rendering, via one of the one or more computing devices, an indicator on the display of the countermeasure device at a position corresponding to the position of the UAV.

5. The method of claim 1, further comprising:
rendering, via one of the one or more computing devices, a camera feed from the countermeasure device on the display; and
augmenting, via one of the one or more computing devices, the camera feed by rendering an overlay, wherein the overlay is based on at least one of: a position of the UAV, a type of signal being emitted, proximate wireless signals, proximate UAVs, or proximate countermeasure devices.

6. The method of claim 1, wherein the particular attack signal comprising a combination of a plurality of different frequencies.

7. The method of claim 1, wherein the one or more computing devices are of a drone tracking system.

8. The method of claim 7, wherein the drone tracking system is separate from the countermeasure device.

9. A system, comprising:
at least one computing device configured to:
determine that an unidentified aerial vehicle (UAV) is within a particular airspace;
determine a location of a countermeasure device;
determine a range of a particular attack signal generated by a signal disruption component and at least one antenna of the countermeasure device;
monitor a distance between the location of the countermeasure device and a location of the UAV;
the countermeasure device comprising a display, the signal disruption component, and the at least one antenna, the countermeasure device being configured to:
render positional information comprising the distance on the display; and
in response to the distance being less than the range of the particular attack signal, generate the particular attack signal comprising a noise signal via the signal disruption component and the at least one antenna.

10. The system of claim 9, wherein the at least one computing device is further configured to:
determine that the UAV is no longer within the range of the countermeasure device; and
in response to determining that the UAV is no longer within the range, stop generation of the particular attack signal.

11. The system of claim 9, wherein a command to generate the particular attack signal originates from a UAV tracking system.

12. The system of claim 9, wherein the at least one computing device is further configured to:
identify an orientation corresponding to the countermeasure device;
compute a position of the UAV relative to an aiming direction of the countermeasure device; and
in response to the position being within the aiming direction, causing an indicator to be rendered on the display of the countermeasure device at a position corresponding to the position of the UAV.

13. The system of claim 9, wherein the at least one computing device is further configured to:
render a camera feed from the countermeasure device on the display; and
augment the camera feed by rendering an overlay, wherein the overlay is based on at least one of: a position of the UAV, a type of signal being emitted, proximate wireless signals, proximate UAVs, or proximate countermeasure devices.

14. The system of claim 9, wherein the particular attack signal comprising a combination of a plurality of different frequencies.

15. The system of claim 9, wherein the location of the countermeasure device is a GPS location.

* * * * *